United States Patent
Song et al.

(10) Patent No.: US 12,489,713 B2
(45) Date of Patent: Dec. 2, 2025

(54) SERVICE FLOW SCHEDULING METHOD AND APPARATUS, AND SYSTEM

(71) Applicant: HUAWEI TECHNOLOGIES CO., LTD., Shenzhen (CN)

(72) Inventors: Jian Song, Beijing (CN); Xiquan Zhao, Shenzhen (CN); Yongping Zhang, Beijing (CN); Zhen Wang, Beijing (CN); Guang Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 363 days.

(21) Appl. No.: 18/339,273

(22) Filed: Jun. 22, 2023

(65) Prior Publication Data
US 2023/0336486 A1    Oct. 19, 2023

Related U.S. Application Data

(63) Continuation of application No. PCT/CN2021/137364, filed on Dec. 13, 2021.

(30) Foreign Application Priority Data

Dec. 24, 2020   (CN) .......................... 202011550634.6
Mar. 12, 2021   (CN) .......................... 202110272534.X

(51) Int. Cl.
*H04L 47/2425*   (2022.01)
*H04L 47/22*     (2022.01)

(52) U.S. Cl.
CPC .......... *H04L 47/2433* (2013.01); *H04L 47/22* (2013.01)

(58) Field of Classification Search
CPC . H04L 47/22; H04L 47/2433; H04L 47/2425; H04L 47/60; H04L 47/6275; H04L 47/808

(Continued)

(56) References Cited

U.S. PATENT DOCUMENTS

| 2005/0249220 A1 | 11/2005 | Olsen et al. |
| 2010/0061235 A1* | 3/2010 | Pai .......................... H04L 47/10 370/230.1 |

(Continued)

FOREIGN PATENT DOCUMENTS

| CN | 101938403 A | 1/2011 |
| CN | 107786468 A * | 3/2018 ........... H04L 47/782 |

(Continued)

OTHER PUBLICATIONS

Huawei Ilab, "Cloud VR Network Solutions White Paper", Cloud VR Internet Solutions WP, Huawei, Sep. 2018, 110 pages.

(Continued)

*Primary Examiner* — Glenford J Madamba
(74) *Attorney, Agent, or Firm* — Maier & Maier, PLLC

(57) ABSTRACT

A service flow scheduling method and apparatus, and a system. When transmission quality of a service flow with a higher priority does not meet a service level requirement corresponding to the service flow, a first network device adjusts, to a first threshold, a transmission rate threshold of an HQoS model for a service flow with a lower priority, where the first threshold is less than a current data transmission rate of the service flow with a lower priority. By performing traffic shaping on the service flow with a lower priority, a bandwidth resource of a downlink port of the first network device may give way to the service flow with a higher priority, to ensure that the service flow with a higher priority meets the service level requirement of the service flow with a higher priority.

16 Claims, 9 Drawing Sheets

(58) Field of Classification Search
USPC .......................................................... 709/238
See application file for complete search history.

(56) References Cited

U.S. PATENT DOCUMENTS

| | | |
|---|---|---|
| 2013/0074087 A1 | 3/2013 | Chambliss et al. |
| 2019/0068503 A1 | 2/2019 | Wei |
| 2021/0075732 A1* | 3/2021 | Singh .................... H04L 47/808 |

FOREIGN PATENT DOCUMENTS

| | | | | |
|---|---|---|---|---|
| CN | 103067302 A | * | 4/2018 | |
| CN | 107872403 A | * | 4/2018 | ............. H04L 47/60 |
| CN | 108206772 A | * | 6/2018 | ......... H04L 12/2874 |
| CN | 110912736 A | * | 3/2020 | ......... H04L 41/0896 |
| CN | 111092825 B | * | 7/2022 | ......... H04L 47/6275 |
| CN | 110266604 B | * | 9/2023 | ............. H04L 47/11 |
| WO | WO-2015014133 A1 | * | 2/2015 | ............. H04L 45/38 |
| WO | WO-2016000358 A1 | * | 1/2016 | |
| WO | WO-2017181873 A1 | * | 10/2017 | ............. H04L 47/50 |
| WO | WO-2017211287 A1 | * | 12/2017 | ............. H04L 47/60 |
| WO | WO-2021238025 A1 | * | 12/2021 | ............. H04L 47/10 |

OTHER PUBLICATIONS

Kundel et al. "Queueing at the Telco Service Edge: Requirements, Challenges and Opportunities", The 2019 Workshop on Buffer Sizing, Dec. 2019, 6 pages.

* cited by examiner

SERVICE FLOW SCHEDULING METHOD AND APPARATUS, AND SYSTEM

CROSS-REFERENCE TO RELATED APPLICATIONS

This application is a continuation of International Application No. PCT/CN2021/137364, filed on Dec. 13, 2021, which claims priorities to Chinese Patent Application No. 202011550634.6, filed on Dec. 24, 2020, and to Chinese Patent Application No. 202110272534.X, filed on Mar. 12, 2021. All of the aforementioned patent applications are hereby incorporated by reference in their entireties.

TECHNICAL FIELD

The embodiments relate to the field of communication technologies and to a service flow scheduling method and apparatus, and a system.

BACKGROUND

With the development of network technologies, a quantity of service flows in a network increases. Different service flows may correspond to different service level requirements. For example, a service level requirement corresponding to a service flow of a delay sensitive service (such as interactive virtual reality and video conferences) usually requires a low delay, a high bandwidth, and a low packet loss rate. However, a service level requirement corresponding to a service flow of a non-delay sensitive service (such as file download and video on demand) requires a high bandwidth, but does not have high requirements on the delay and the packet loss rate.

A service flow sent by a server end is forwarded to a user terminal through multiple levels of network devices. The multiple levels of network devices usually include: a backbone router, a service router (SR), a local area network switch (LSW), an optical line terminal (OLT), an optical network terminal (ONT), and the like. If receiving different service flows, the foregoing network device usually mixes the different service flows into one queue for scheduling. However, this scheduling method cannot meet service level requirements of the different service flows.

SUMMARY

The embodiments provide a service flow scheduling method and apparatus, and a system, to resolve a problem that the scheduling method in the related technology cannot meet service level requirements of different service flows.

According to a first aspect, a service flow scheduling method is provided. The method includes: a first network device separately schedules a first service flow and a second service flow based on a hierarchical quality of service (HQoS) model, where a priority of the first service flow is higher than a priority of the second service flow. When transmission quality (for example, one or more of a delay of service transmission, a packet loss rate, a data transmission rate, and a burst size) of the first service flow does not met a service level requirement corresponding to the first service flow, the first network device may adjust, to a first threshold, a transmission rate threshold of the HQoS model for the second service flow, where the first threshold is less than a current data transmission rate of the second service flow. For example, the service level requirement may be a requirement defined by a service level agreement (SLA) or another agreed requirement.

Because the first threshold is less than the current data transmission rate of the second service flow with a lower priority, traffic shaping on the second service flow with a lower priority can be implemented. Further, a bandwidth resource of a downlink port of the first network device may give way to the first service flow with a higher priority, to ensure that the service level requirement of the first service flow with a higher priority can be preferentially met.

Optionally, the first threshold is greater than or equal to an average data transmission rate of the second service flow, to prevent the traffic shaping from severely affecting transmission quality of the second service flow.

Optionally, a process in which the first network device adjusts, to the first threshold, the transmission rate threshold of the HQoS model for the second service flow may include: when the transmission quality of the first service flow does not meet the service level requirement corresponding to the first service flow, and the current data transmission rate of the second service flow is greater than a peak threshold of a data transmission rate of the second service flow, the transmission rate threshold of the HQoS model for the second service flow is adjusted to the first threshold.

When the current data transmission rate of the second service flow is greater than the peak threshold of the data transmission rate of the second service flow, the first network device may determine that a traffic burst currently exists in the second service flow. Because the traffic burst severely preempts a bandwidth resource of another service flow, the first network device performs traffic shaping on the second service flow in which the traffic burst exists, thereby effectively improving the transmission quality of the first service flow.

Optionally, the transmission rate threshold of the second service flow includes one or more of the following: a peak information rate (PIR), a committed access rate (CAR), a committed information rate (CIR), and an excess information rate (EIR). It can be understood that the transmission rate threshold of the second service flow includes any one of the PIR, the CAR, the CIR, and the EIR. If the transmission rate threshold of the second service flow includes a plurality of rates in the PIR, the CAR, the CIR, and the EIR, the first network device needs to separately adjust each rate in the transmission rate threshold. In a possible implementation, the first network device may adjust all the plurality of rates in the transmission rate threshold to a same first threshold, in other words, adjusted rates are equal to each other. In another possible implementation, the first network device may separately adjust the plurality of rates in the transmission rate threshold to respective corresponding thresholds, that is, adjusted rates may have different values.

Optionally, in a network scenario, the first network device is connected to a terminal through a second network device, and the HQoS model includes multiple levels of schedulers, for example, a first-level scheduler corresponding to the downlink port of the first network device, a second-level scheduler corresponding to a downlink port of the second network device, a first underlying scheduler configured to transmit the first service flow through the downlink port of the second network device, and a second underlying scheduler configured to transmit the second service flow through the downlink port of the second network device.

In the foregoing multiple levels of schedulers, the first underlying scheduler corresponds to the first service flow transmitted by the downlink port of the second network device, and the second underlying scheduler corresponds to the second service flow transmitted by the downlink port of the second network device. The first network device may separately schedule the first service flow and the second service flow through the two underlying schedulers.

Optionally, an implementation in which the first network device adjusts, to the first threshold, the transmission rate threshold of the HQoS model for the second service flow includes: The first network device adjusts, to the first threshold, a transmission rate threshold of at least one scheduler of the first-level scheduler, the second-level scheduler, and the second underlying scheduler for the second service flow.

For example, to avoid affecting transmission quality of another service flow, the first network device may adjust, to the first threshold, only a transmission rate threshold of the second underlying scheduler for the second service flow.

Optionally, an implementation in which the first network device adjusts, to the first threshold, the transmission rate threshold of the HQoS model for the second service flow includes: a target scheduler on which network congestion occurs during transmission of the first service flow is determined, where the target scheduler is the first-level scheduler or the second-level scheduler; and a transmission rate threshold of the target scheduler for the second service flow is adjusted to the first threshold.

The transmission rate threshold of the target scheduler for the second service flow is adjusted, so that congestion occurring when the target scheduler transmits the first service flow can be effectively alleviated, thereby improving the transmission quality of the first service flow.

Optionally, a sum of a transmission rate threshold of the first-level scheduler for the first service flow and that of the first-level scheduler for the second service flow may be less than or equal to a maximum bandwidth of the downlink port of the first network device, and a sum of a transmission rate threshold of the second-level scheduler for the first service flow and that of the second-level scheduler for the second service flow may be less than or equal to a maximum bandwidth of the downlink port of the second network device.

When a sum of transmission rate thresholds of the scheduler for all service flows is less than or equal to a maximum bandwidth of a downlink port of a corresponding network device, it can be ensured that a bandwidth of the downlink port of the network device can meet a bandwidth requirement of a service flow scheduled by the scheduler.

Optionally, a transmission rate threshold of the first underlying scheduler for the first service flow is less than or equal to the maximum bandwidth of the downlink port of the second network device. A transmission rate threshold of the second underlying scheduler for the second service flow is less than or equal to the maximum bandwidth of the downlink port of the second network device.

Optionally, the first underlying scheduler includes a first queue for buffering a packet of the first service flow, and the second underlying scheduler includes a second queue for buffering a packet of the second service flow. A sum of a maximum queue buffer of the first queue and a maximum queue buffer of the second queue is less than or equal to a maximum port buffer of the downlink port of the second network device.

When a sum of maximum queue buffers of queues in each underlying scheduler is less than or equal to the maximum port buffer of the downlink port of the second network device, it can be ensured that a port buffer of the downlink port of the second network device can meet a buffer requirement of a service flow scheduled by the underlying scheduler.

Optionally, an upper limit of a delay in the service level requirement of the first service flow may be less than an upper limit of a delay in the service level requirement of the second service flow. In other words, a priority of a service flow having a higher delay requirement (that is, a high real-time requirement) may be higher, and a priority of a service flow having a lower delay requirement (that is, a low real-time requirement) may be lower.

Optionally, the method may further include: the first network device schedules a third service flow based on the HQoS model, where a priority of the third service flow is higher than the priority of the second service flow and lower than the priority of the first service flow; and when the transmission rate threshold of the second service flow is less than or equal to the average data transmission rate of the second service flow, or when the current data transmission rate of the second service flow is less than or equal to the peak threshold of the data transmission rate of the second service flow, the first network device adjusts, to a second threshold, a transmission rate threshold of the HQoS model for the third service flow, where the second threshold is less than a current data transmission rate of the third service flow, thereby implementing traffic shaping on the third service flow.

In the embodiments, when the second service flow does not meet a condition for traffic shaping, traffic shaping may be performed on another third service flow with a lower priority, to ensure that the service level requirement of the first service flow is met.

According to a second aspect, a service flow scheduling apparatus is provided. The scheduling apparatus is configured for a first network device, and the scheduling apparatus includes at least one module. The at least one module may be configured to implement the service flow scheduling method provided in the first aspect or an optional solution of the first aspect.

According to a third aspect, a service flow scheduling apparatus is provided. The service flow scheduling apparatus includes a memory and a processor. The memory is configured to store a computer program or code, and the processor is configured to execute the computer program or code to implement the service flow scheduling method provided in the first aspect or an optional solution of the first aspect.

According to a fourth aspect, a computer-readable storage medium is provided. The computer-readable storage medium includes instructions or code, and when the instructions or code are executed on a computer, the computer is enabled to perform the service flow scheduling method provided in the first aspect or an optional solution of the first aspect.

According to a fifth aspect, a chip is provided. The chip includes a programmable logic circuit and/or program instructions, and the chip is configured to perform the service flow scheduling method provided in the first aspect or the optional solution of the first aspect.

According to a sixth aspect, a computer program product is provided. The computer program product includes a program or code, and when the program or code is run on a computer, the computer is enabled to perform the service flow scheduling method provided in the first aspect or the optional solution of the first aspect.

According to a seventh aspect, a traffic scheduling system is provided. The traffic scheduling system includes a terminal and a first network device, the first network device is configured to schedule a first service flow and a second service flow of the terminal, and the first network device includes the service flow scheduling apparatus provided in the second aspect or the third aspect. Alternatively, the first network device includes the chip provided in the fifth aspect.

Optionally, the traffic scheduling system may further include a second network device, and the first network device is connected to the terminal through the second network device.

Thus, embodiments provide the service flow scheduling method and apparatus, and the system. When transmission quality of a service flow with a higher priority does not meet a service level requirement corresponding to the service flow, the first network device adjusts, to the first threshold, a transmission rate threshold of the HQoS model for a service flow with a lower priority, where the first threshold is less than a current data transmission rate of the service flow with a lower priority. According to this solution, traffic shaping can be implemented for the service flow with a lower priority. Further, the bandwidth of the downlink port of the first network device may give way to the service flow with a higher priority, to ensure that the service level requirement of the service flow with a higher priority can be preferentially met.

DETAILED DESCRIPTION OF EMBODIMENTS

The following describes in detail a service flow scheduling method and apparatus, and a system provided in embodiments with reference to the accompanying drawings.

Figure 1:
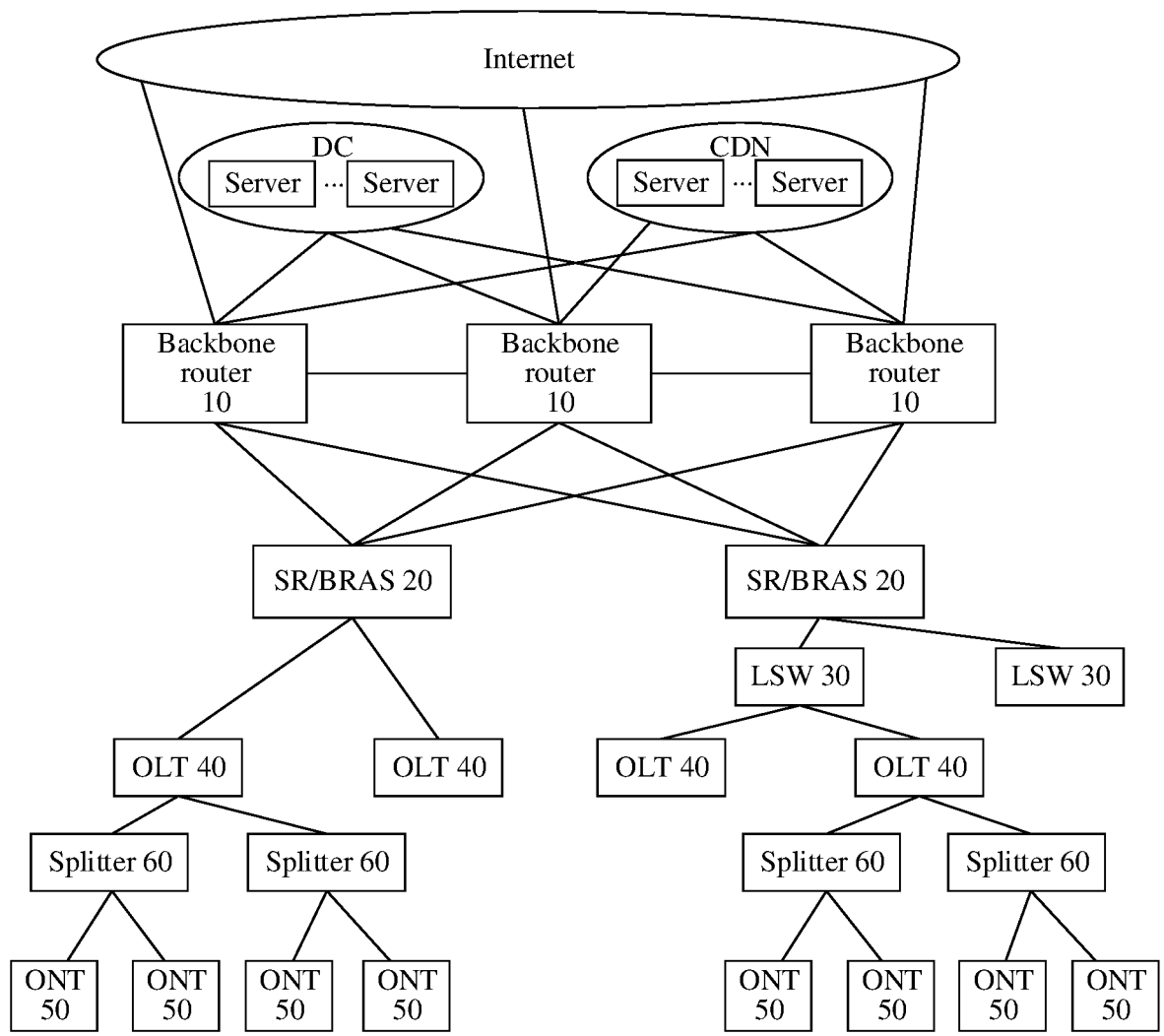
FIG. 1 is a schematic diagram of a network scenario of a traffic scheduling system according to an embodiment.

FIG. 1 is a schematic diagram of a network scenario of a traffic scheduling system according to an embodiment. As shown in FIG. 1, to avoid a service experience problem and a network lease cost problem caused by long-distance data transmission, a service provider (for example, a service provider of video content) may establish a data center (DC) in each key area, or lease a content delivery network (CDN) provided by an operator. Therefore, a server configured to provide a service flow may be arranged in an area that is close to terminals, such as a city or a county, so that the terminals may obtain service flows (for example, a video flow) from the server in the DC or the CDN close to the terminals, thereby effectively improving experience of terminal users. The terminal may also be referred to as user equipment, and may be a mobile phone, a computer, a wearable device, a smart home device, or the like.

In this embodiment, the server in the DC and the CDN may forward the service flow to the terminal through multiple levels of network devices. As shown in FIG. 1, the multiple levels of network devices may include: a backbone router 10, an SR 20, an LSW 30, an OLT 40, an ONT 50, and the like that are sequentially cascaded. An uplink port of the backbone router 10 may be connected to the server in the DC and/or the CDN to access the Internet, and the ONT 50 is connected to one or more terminals. Refer to FIG. 1, the traffic scheduling system may further include a splitter 60, and the OLT 40 may be connected to a plurality of ONTs 50 through the splitter 60. In addition, the backbone router 10 and the LSW 30, or the backbone router 10 and the OLT 40 may be connected to each other through a broadband access server (BAS). For example, the BAS may be a broadband remote access server (BRAS). For ease of description, nodes between the backbone router 10 and the OLT 40 are collectively referred to as SR/BRAS 20 below.

It can be understood that, in a possible implementation, the SR/BRAS 20 shown in FIG. 1 may be directly connected to the OLT 40, that is, the traffic scheduling system may alternatively not include the LSW 30. In another possible implementation, the SR/BRAS 20 shown in FIG. 1 may be connected to the OLT 40 through a plurality of cascaded LSWs 30. In still another possible implementation, the OLT 40 may not be included between the LSW 30 and the ONT 50 shown in FIG. 1. In still another possible implementation, the LSW 30 and the ONT 50 shown in FIG. 1 may be connected to each other through a plurality of cascaded OLTs 40. In still another possible implementation, the ONT 50 may not be included between the OLT 40 shown in FIG. 1 and the terminal. In still another possible implementation, the OLT 40 shown in FIG. 1 may be connected to the terminal through a plurality of cascaded ONTs 50. In the foregoing description, cascading between network devices may refer to: a downlink port of one network device is connected to an ingress port of another network device.

With the development of the 5th generation mobile communication technology ( ) and new services thereof, network traffic keeps increasing, and types of service flows in a network are more abundant. Because traffic of different types of service flows varies greatly and service level requirements are different, a higher requirement is put forward for a capability of ensuring service level requirements of the traffic scheduling system. When there are a large quantity of service flows in the traffic scheduling system, network congestion may occur in the traffic scheduling system. As a result, transmission quality of some service flows does not meet corresponding service level requirements. For ease of description, the service level requirement corresponding to the service flow is referred to as the service level requirement of the service flow below. It can be understood that, in this embodiment, the service level requirement may be a requirement defined in an SLA.

In the traffic scheduling system, because the backbone router has high throughput and high processing capabilities, and service flows can be load balanced among backbone routers. Therefore, the backbone router is usually not a bottleneck of network congestion. Traffic pressure of the traffic scheduling system is concentrated in a metropolitan area network, that is, as shown in FIG. 1, network congestion usually occurs on a link between the SR/BRAS 20 and the LSW 30, a link between the LSW 30 and the OLT 40, and a link between the OLT 40 and the ONT 50.

An embodiment provides a service flow scheduling method. According to the scheduling method, a traffic scheduling system can preferentially meet a service level requirement of a service flow with a higher priority, thereby effectively improving a capability of ensuring service level requirements of the traffic scheduling system. The scheduling method may be applied to a first network device in the traffic scheduling system. The first network device may be the SR/BRAS 20, the LSW 30, the OLT 40, or the ONT 50 in the system shown in FIG. 1.

In this embodiment, an HQoS model is deployed in the first network device. In the HQoS model, scheduling queues can be classified into a plurality of scheduling levels. Traffic management can be performed in each level based on different traffic characteristics, to implement service management of multi-user and multi-service. The first network device classifies a plurality of received service flows into different priorities, and may perform differentiated scheduling on service flows with different priorities based on the HQoS model. For example, when transmission quality of a service flow with a higher priority does not meet a service level requirement of the service flow, traffic shaping may be performed on a service flow with a lower priority. Traffic shaping is a manner of adjusting a data transmission rate of a service flow, and can limit a burst of the service flow, so that the service flow is sent out at a uniform rate. By performing traffic shaping on the service flow with a lower priority, a bandwidth of a downlink port of the first network device may give way to the service flow with a higher priority, to ensure that the service level requirement of the service flow with a higher priority can be preferentially met.

In a possible implementation, the first network device may be connected to a terminal through a second network device. The HQoS model may include: a first-level scheduler 21 corresponding to the downlink port of the first network device, a second-level scheduler 22 corresponding to a downlink port of the second network device, and N underlying schedulers configured to transmit, through the downlink port of the second network device, L service flows with different priorities. Both L and N are integers greater than 1, and N is greater than or equal to L. Each underlying scheduler corresponds to a service flow of one priority that is transmitted through the downlink port of the second network device, and is configured to schedule the service flow of one priority corresponding to the underlying scheduler. Because the underlying scheduler corresponds to the service flow, the underlying scheduler may also be referred to as a flow queue (FQ)-level scheduler.

It can be understood that, if N=L, a service flow of one priority may correspond to one underlying scheduler, that is, a service flow of one priority may be scheduled by a corresponding underlying scheduler. If N is greater than L, a service flow of one priority may correspond to a plurality of underlying schedulers, that is, a service flow of one priority may be scheduled by a plurality of corresponding underlying schedulers. For example, assuming that L=4 and N=8, a service flow of each priority may be scheduled by two underlying schedulers. For another example, assuming that a service flow transmitted through the downlink port of the second network device includes a first service flow with a higher priority and a second service flow with a lower priority, the N underlying schedulers may include at least: a first underlying scheduler 23 configured to transmit the first service flow through the downlink port of the second network device, and a second underlying scheduler 24 configured to transmit the second service flow through the downlink port of the second network device. Alternatively, it can be understood as that: the N underlying schedulers include at least the first underlying scheduler 23 corresponding to the first service flow and the second underlying scheduler 24 corresponding to the second service flow.

In this embodiment, it can be understood that the schedulers correspond to the downlink ports of the network devices may be: the schedulers establish a mapping relationship with the downlink ports of the network devices, and schedules the service flows based on port parameters (such as a maximum bandwidth and/or a maximum port buffer) of the downlink ports.

In this embodiment, it can be further understood that the first network device may be connected to the terminal through a plurality of cascaded second network devices. Correspondingly, the HQoS model may include a plurality of second-level schedulers 22 in a one-to-one correspondence with downlink ports of the plurality of cascaded second network devices. For example, refer to FIG. 2, it is assumed that the first network device is an SR/BRAS 20, and the SR/BRAS 20 may be connected to a first terminal 03 through an LSW 30, an OLT 40, or an ONT 50, that is, the SR/BRAS 20 is connected to the first terminal 03 through the LSW 30, the OLT 40, or the ONT 50 that is used as the second network device. If a downlink port of the ONT 50 can transmit four types of service flows with different priorities (that is, N=4), the HQoS model may include: a first-level scheduler 21 corresponding to the SR/BRAS 20, second-level schedulers 22 in a one-to-one correspondence with the second network device, and four underlying schedulers in a one-to-one correspondence with the four types of service flows with different priorities.

Figure 2:
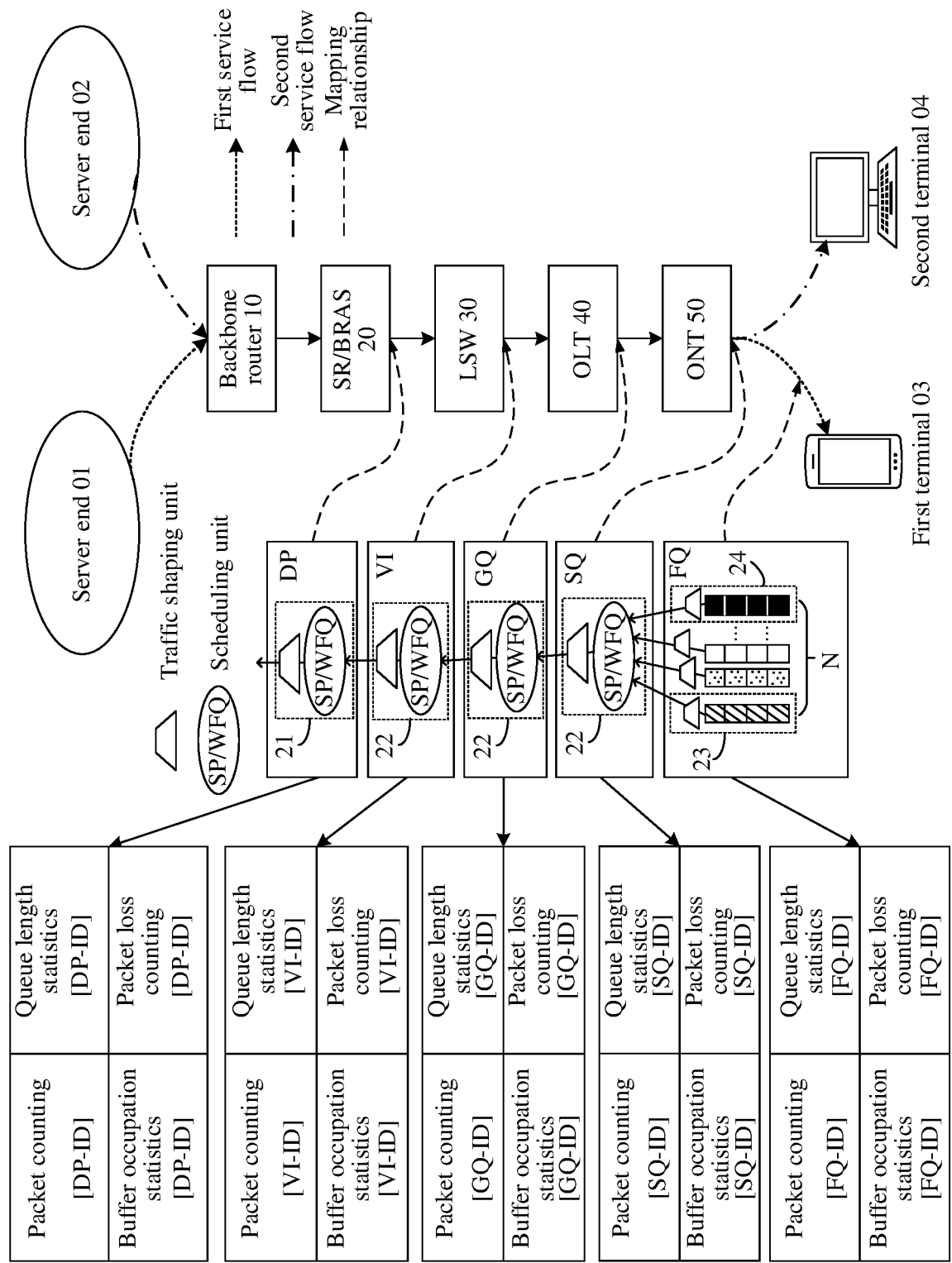
FIG. 2 is a schematic diagram of a structure of an HQoS model according to an embodiment.

Optionally, as shown in FIG. 2, both the first-level scheduler 21 and the second-level scheduler 22 in the HQoS model may include a scheduling unit and a shaping unit, and the underlying scheduler may include a shaping unit. The shaping unit is configured to perform traffic shaping on the service flow. The scheduling unit is configured to select, based on a preconfigured scheduling policy, a packet in a scheduler from a plurality of schedulers connected to the scheduling unit, and schedule the packet. Optionally, the scheduling policy may include strict priority (SP) scheduling, weighted fair queue (WFQ) scheduling, and the like.

Referring to FIG. 2, it can be understood that structures of the plurality of schedulers in the HQoS model may be the same as topology structures of the plurality of network devices corresponding to the plurality of schedulers. In other words, the first-level scheduler may be connected to the N underlying schedulers through one second-level scheduler or a plurality of cascaded second-level schedulers.

In a network scenario in which the first network device is the SR/BRAS 20, and the SR/BRAS 20 is connected to the terminal through the LSW 30, the OLT 40, and the ONT 50 that are sequentially cascaded, the first-level scheduler 21 in the HQoS model may be a dummy port (DP)-level scheduler. The HQoS model includes three second-level schedulers 22. For example, an included second-level scheduler 22 corresponding to a downlink egress port of the LSW 30 may be a virtual interface (VI)-level scheduler, a second-level scheduler 22 corresponding to a downlink egress port of the OLT 40 may be a user group queue (GQ)-level scheduler, and a second-level scheduler 22 corresponding to a downlink egress port of the ONT 50 may be a subscriber queue (SQ)-level scheduler.

Figure 3:
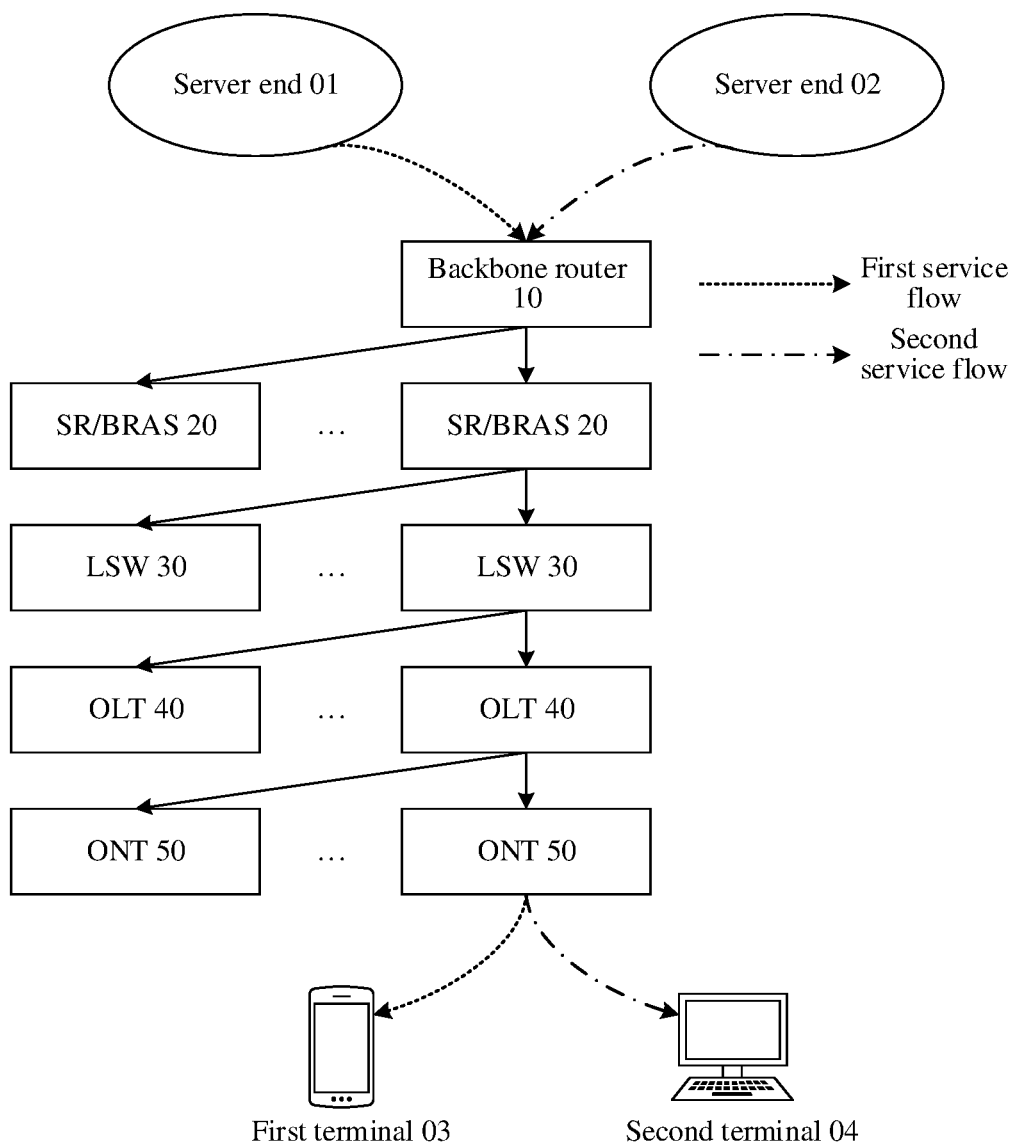
FIG. 3 is a schematic diagram of a structure of another traffic scheduling system according to an embodiment.
Figure 4:
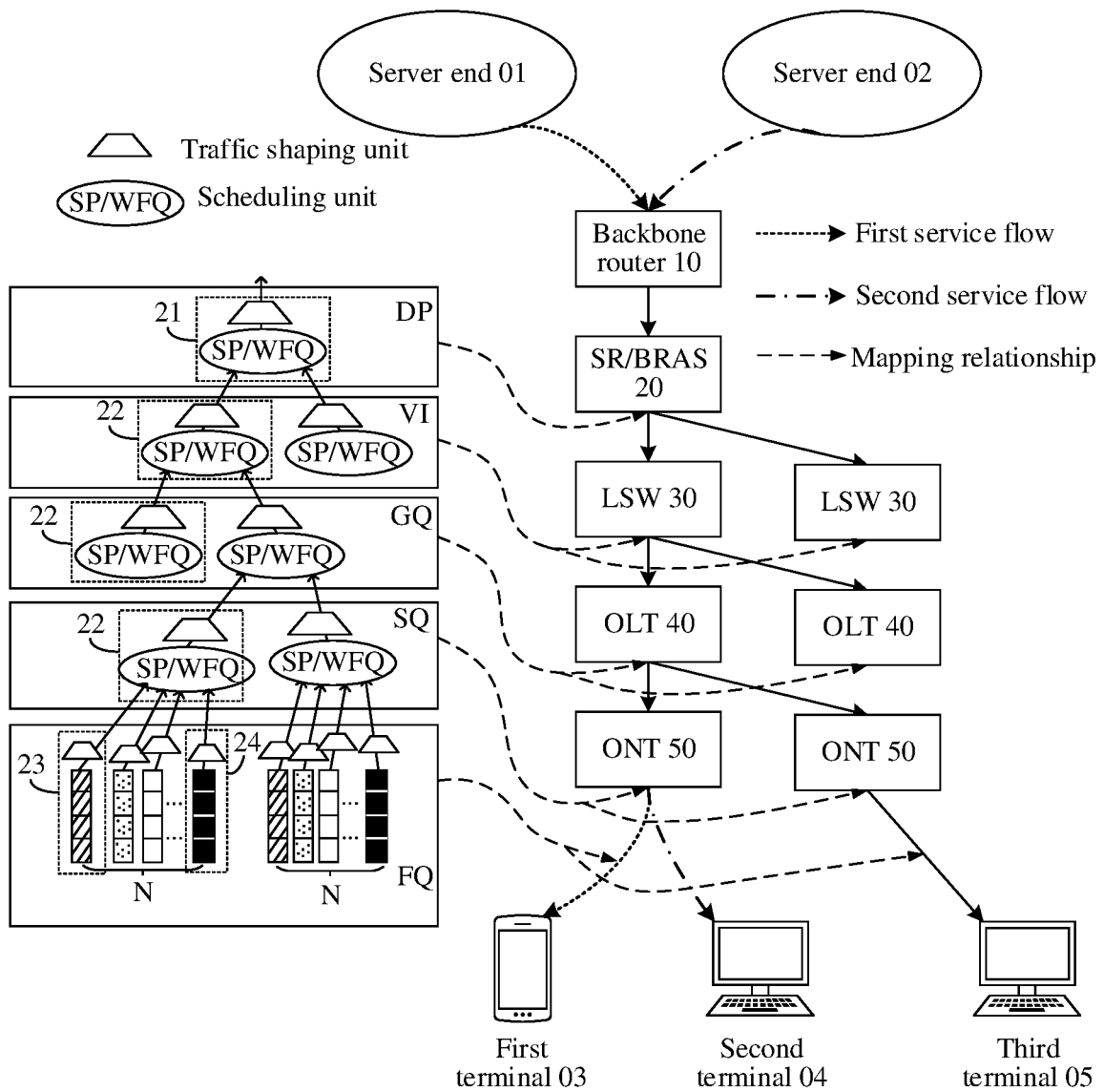
FIG. 4 is a schematic diagram of a structure of another HQoS model according to an embodiment.

FIG. 3 is a schematic diagram of a structure of another traffic scheduling system according to an embodiment, and FIG. 4 is a schematic diagram of a structure of another HQoS model according to an embodiment. With reference to FIG. 1, FIG. 3, and FIG. 4, it can be understood that, in the traffic scheduling system, the SR/BRAS 20 may be connected to a plurality of LSWs 30, the LSW 30 may be connected to a plurality of OLTs 40, and the OLT 40 may be connected to a plurality of ONTs 50. For example, in the network scenario shown in FIG. 4, an OLT 40 is connected to two ONTs 50, where one ONT 50 is separately connected to a first terminal 03 and a second terminal 04, and the other ONT 50 is connected to a third terminal 05. As shown in FIG. 4, a HQoS model in the SR/BRAS 20 may include a DP-level scheduler (that is, a first-level scheduler 21), and may further include: a plurality of VI-level schedulers corresponding to the plurality of LSWs 30, a plurality of GQ-level schedulers corresponding to the plurality of OLTs 40, and a plurality of SQ-level schedulers corresponding to the plurality of ONTs 50. One SQ-level scheduler may be connected to a plurality of underlying schedulers.

It can be understood that each ONT 50 in the traffic scheduling system may correspond to one user and is configured to connect one or more terminals of the user to a network. Correspondingly, the plurality of SQ-level schedulers in the HQoS model may be configured to distinguish service flows of different users, in other words, each SQ-level scheduler may be configured to schedule a service flow of one user. The user may refer to a virtual local area network (VLAN), a virtual private network (VPN), a home broadband subscriber, or the like. A plurality of underlying schedulers connected to each SQ-level scheduler may be configured to distinguish service flows with different priorities of a same user, and a service flow of each priority may include one or more types of service flows.

For example, it is assumed that a service flow of a user includes four different types of service flows: a voice service flow, a game service flow, a video on demand service flow, and a file download service flow. In addition, in the four different types of service flows, both the voice service flow and the game service flow belong to service flows with a higher priority, and both the video on demand service flow and the file download service flow belong to service flows with a lower priority. Correspondingly, an SQ-level scheduler corresponding to the user may be connected to at least two underlying schedulers, where one underlying scheduler is configured to schedule the service flows with a higher priority, and the other underlying scheduler is configured to schedule the service flows with a lower priority.

It can be further understood that a quantity of underlying schedulers connected to different SQ-level schedulers may be the same or different. For example, if a service flow of each user may be classified into N different priorities, each SQ-level scheduler may be connected to N underlying schedulers. If a service flow of a first user may be classified into N1 different priorities, and a service flow of a second user may be classified into N2 different priorities, an SQ-level scheduler corresponding to the first user may be connected to N1 underlying schedulers, and an SQ-level scheduler corresponding to the second user may be connected to N2 underlying schedulers. Both N1 and N2 are integers greater than 1, and N1 is not equal to N2.

It can be further understood that a quantity of schedulers of any level included in the HQoS model may be greater than a quantity of network devices of a corresponding level that is included in the traffic scheduling system. For example, in the HQoS model, a quantity of the VI-level schedulers may be greater than a quantity of the LSWs 30 connected to the SR/BRAS 20, a quantity of the GQ-level schedulers may be greater than a quantity of the OLTs 40, and a quantity of the SQ-level schedulers may be greater than a quantity of the ONTs 50. In addition, if a user service flow corresponding to an SQ-level scheduler can be classified into N different priorities, a quantity of underlying schedulers connected to the SQ-level scheduler may be greater than N. A large quantity of schedulers is designed in the HQoS model, so that when the traffic scheduling system is subsequently expanded or updated, the HQoS model have enough schedulers to establish a mapping relationship with a newly added network device in the traffic scheduling system. Therefore, application flexibility of the HQoS model is effectively improved.

It can be further understood that the first network device (for example, the SR/BRAS 20) may include a plurality of downlink ports, and a plurality of HQoS models in a one-to-one correspondence with the plurality of downlink ports may be deployed in the first network device. In other words, the HQoS models may be deployed for each downlink port of the first network device.

It can be further understood that, in this embodiment, all downlink ports of the network device may be physical ports or virtual ports. The virtual port may be a trunk port formed by a plurality of physical ports.

With reference to the diagram of the network scenario shown in FIG. 4, the following describes a process in which the first network device schedules a service flow based on the HQoS model. After receiving the service flow sent by an upstream device (for example, the backbone router 10), the first network device may first determine a user to which the service flow belongs, and determine, from the plurality of SQ-level schedulers included in the HQoS model, a target SQ-level scheduler corresponding to the user. For example, the first network device may determine, based on access control lists (ACL), the user to which the service flow belongs. Then, the first network device may determine a priority of the service flow based on a type of the service flow, and determine, from a plurality of underlying schedulers connected to the target SQ-level scheduler, a target underlying scheduler corresponding to the priority of the service flow. Then, the first network device may add a packet of the service flow to a queue in the target underlying scheduler. Further, the first network device may schedule the packet in the target underlying scheduler separately through the target SQ-level scheduler, the GQ-level scheduler, the VI-level scheduler, and the DP-level scheduler, so that the packet of the service flow is transmitted to the DP-level scheduler sequentially through the target SQ-level scheduler, the GQ-level scheduler, and the VI-level scheduler. The DP-level scheduler may further send the packet to a next-level second network device through a downlink egress port of the first network device, for example, to the LSW 30.

It can be understood that the ONT 50 in the scheduling system may be connected to a plurality of terminals of a same user, and types of service flows transmitted by the ONT 50 to different terminals may be the same, in other words, priorities of the service flows transmitted by the ONT 50 to different terminals may be the same. In this scenario, the first network device may schedule, through one underlying scheduler, a plurality of service flows that are transmitted to different terminals but have a same priority. For example, assuming that an ONT 50 is separately connected to a mobile phone and a computer of a user, and the mobile phone and the computer are separately downloading a file, the HQoS model may schedule, in a same underlying scheduler, a file download service flow transmitted to the mobile phone and a file download service flow transmitted to the computer.

It can be understood from a scheduling principle of the foregoing HQoS model that, based on the HQoS model, the first network device can distinguish service flows of different users, and also distinguish different types of service flows of a same user, thereby achieving refinement on traffic scheduling.

Figure 5:
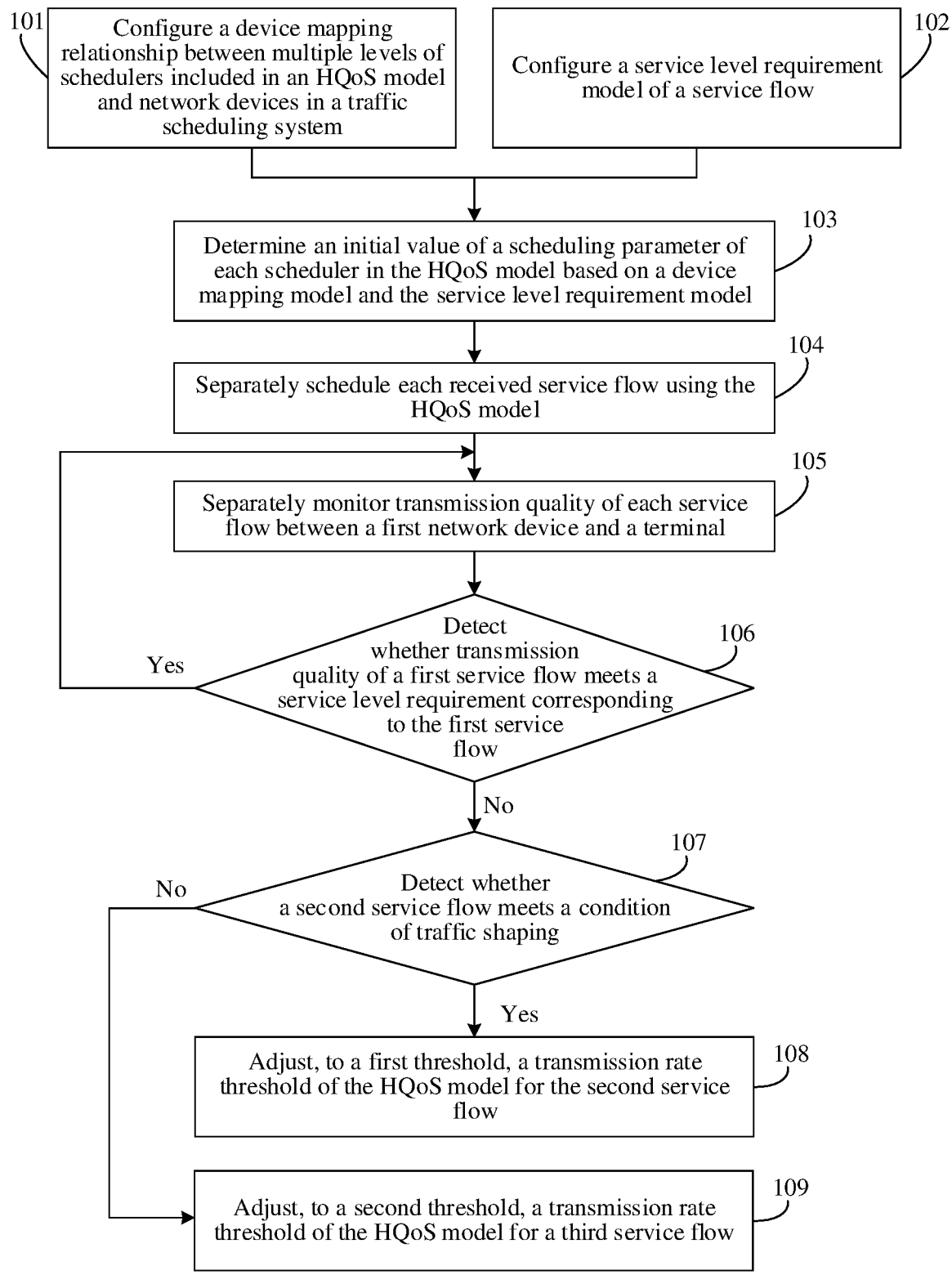
FIG. 5 is a flowchart of a service flow scheduling method according to an embodiment.

FIG. 5 is a flowchart of a service flow scheduling method according to an embodiment. The method may be applied to a first network device in a traffic scheduling system. The first network device may be the SR/BRAS 20, the LSW 30, the OLT 40, or the ONT 50 shown in any one of FIG. 1 to FIG. 4. Refer to FIG. 5, the method includes the following steps:

Step 101: Configure a device mapping relationship between multiple levels of schedulers included in an HQoS model and network devices in the traffic scheduling system.

In this embodiment, the multiple levels of schedulers in the HQoS model of the first network device are respectively corresponding to port parameters of downlink ports of network devices of different levels. The first network device may record a mapping relationship between each scheduler in the HQoS model and a port parameter of a corresponding network device, to obtain a device mapping model. The port parameter may include at least: a maximum bandwidth. In addition to the maximum bandwidth, the port parameter may further include: a maximum port buffer.

Optionally, the network device may include a plurality of queues with different priorities, each queue is for buffering a packet of a service flow of one priority, and the downlink port of the network device may schedule packets in the plurality of queues according to a specific scheduling proportion. Correspondingly, the port parameter of the downlink port of the network device may further include: a scheduling proportion of queues with different priorities.

It can be understood that, because an underlying scheduler in the HQoS model corresponds to service flows with different priorities transmitted through a downlink port of a second network device, the device mapping model may further record a mapping relationship between the underlying scheduler and a port parameter of the downlink port of the second network device, and a mapping relationship between the underlying scheduler and the service flows with different priorities.

Figure 6:
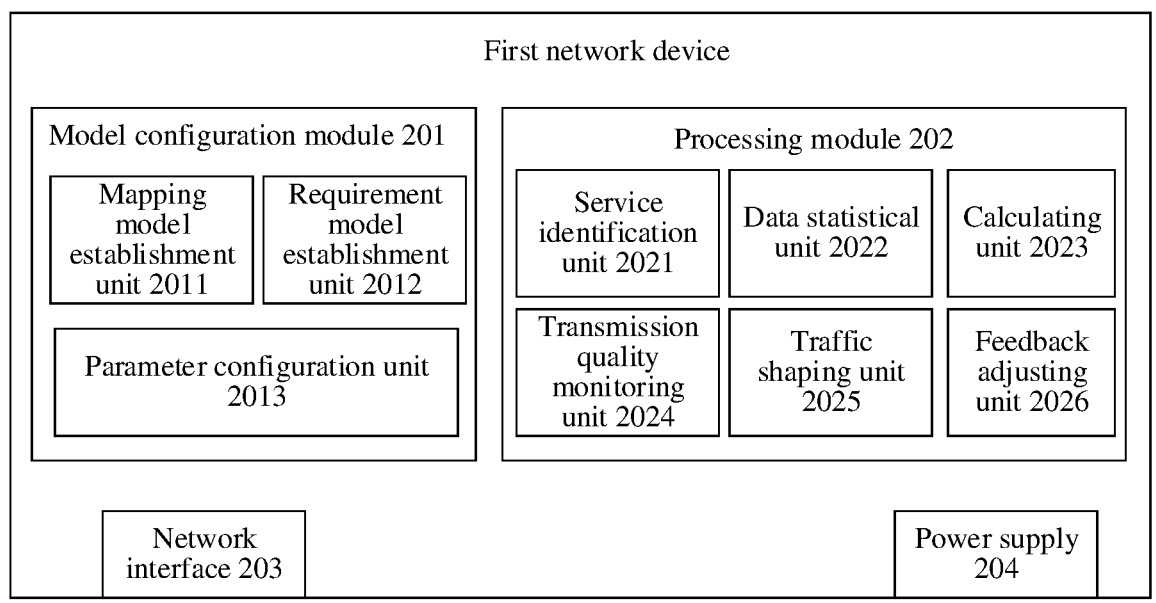
FIG. 6 is a schematic diagram of a structure of a first network device according to an embodiment.

For example, FIG. 6 is a schematic diagram of a structure of a first network device according to an embodiment. As shown in FIG. 6, the first network device includes a model configuration module 201, and the model configuration module 201 includes a mapping model establishment unit 2011. The mapping model establishment unit 2011 can establish a device mapping model based on the port parameter configured in the first network device. Refer to FIG. 2 and FIG. 4, the device mapping model may record the following mapping relationship: the DP-level scheduler and a port parameter of a downlink port of an SR/BRAS 20 corresponding to the DP-level scheduler, the VI-level scheduler and a port parameter of a downlink port an LSW 30 corresponding to the VI-level scheduler, and the GQ-level scheduler and a port parameter of a downlink port of an OLT 40 corresponding to the GQ-level scheduler, the SQ-level scheduler and a port parameter of a downlink port of an ONT 50 corresponding to the SQ-level scheduler, the underlying scheduler and a port parameter of a downlink port of an ONT 50 corresponding to the underlying scheduler, and underlying scheduler and a priority of a service flow corresponding to the underlying scheduler. It can be understood that the device mapping model includes one or more schedulers in the VI-level scheduler, the GQ-level scheduler, and the SQ-level scheduler.

The foregoing port parameters may be configured as static parameters, and does not change with running of the network device. Therefore, the port parameters may be configured in the first network device in advance. In addition, the port parameters may be used as a constraint for subsequently determining initial values of scheduling parameters of the schedulers. In other words, when an initial value of a scheduling parameter of a scheduler is determined, it needs to be ensured that the initial value can meet a constraint of a port parameter of a downlink port of a network device corresponding to the scheduler.

Step 102: Configure a service level requirement model of the service flow.

In this embodiment, the first network device may store a mapping relationship between the service flow and the service level requirement of the service flow, to obtain the service level requirement model. The service level requirement of the service flow may include limitation on at least one of the following parameters: a delay, a packet loss rate, and a data transmission rate. It can be understood that each parameter in the service level requirement may be an end-to-end parameter, and end-to-end refers to the first network device to the terminal.

As shown in FIG. 6, the model configuration module 201 of the first network device further includes a requirement model establishment unit 2012. The requirement model establishment unit 2012 can establish the service level requirement model of the service flow based on a service level requirement of each service flow configured in the first network device. Assuming that service level requirements of M service flows are configured in the first network device, and the service level requirements are requirements defined in an SLA, in the service level requirement model established by the requirement model establishment unit 2012, the service level requirement of an $i^{th}$ service flow may be represented as: SLA_i={Xi, Yi, Zi, . . . }. M is an integer greater than 1, and i is a positive integer not greater than M. Xi, Yi, and Zi may respectively indicate a limited threshold of one parameter in the service level requirements.

For example, Xi may indicate an upper limit of the delay, Yi may indicate an upper limit of the packet loss rate, and Zi may indicate a lower limit of the data transmission rate. Correspondingly, to meet the service level requirement of the $i^{th}$ service flow, it needs to be ensured that an end-to-end delay of the $i^{th}$ service flow is not greater than Xi, an end-to-end packet loss rate is not greater than Yi, and an end-to-end data transmission rate is not less than Zi. Assuming that the $i^{th}$ service flow is a cloud VR service flow requiring that a delay from the first network device to the terminal is less than 20 milliseconds (ms), Xi in the service level requirement may be 20 ms.

Optionally, the limited threshold of each parameter in the service level requirement may be an empirical value, or may be derived based on a modeling theory. For example, the first network device may perform modeling on traffic distribution of the service flow and a processing capability of the network device, to obtain a limited threshold of each parameter in the service level requirement by estimation. The modeling theory may include: Poisson distribution modeling, queuing theory modeling, network calculus, artificial intelligence (AI) modeling, and the like. A model obtained based on the queuing theory modeling may be an M/D/1 model.

Step 103: Determine an initial value of a scheduling parameter of each scheduler in the HQoS model based on the device mapping model and the service level requirement model.

For a scheduler in the HQoS model, the first network device may determine an initial value of a scheduling parameter of the scheduler based on a port parameter of a network device corresponding to the scheduler that is recorded in the device mapping model and a service level requirement of each service flow that is recorded in the service level requirement model. The scheduling parameter of the scheduler indicates a scheduling policy for the service flow.

Optionally, the scheduling parameter may include: transmission rate thresholds of the scheduler for service flows with different priorities, where the transmission rate thresholds are used to limit rates of the service flows transmitted by the scheduler. The transmission rate thresholds of the scheduler for service flows with different priorities may be the same or may be different. In addition, a transmission rate threshold of the scheduler for a service flow of each priority is less than or equal to a maximum bandwidth of a downlink port of a network device corresponding to the scheduler.

For example, it is assumed that service flows received by the first network device include a first service flow and a second service flow, and a priority of the first service flow is higher than a priority of the second service flow. In the HQoS model, a sum of a transmission rate threshold of the first-level scheduler 21 for the first service flow and that of the first-level scheduler 21 for the second service flow is less than or equal to a maximum bandwidth of the downlink port (the downlink port refers to a downlink port corresponding to the HQoS model) of the first network device (for example, the SR/BRAS 20). A sum of a transmission rate threshold of the second-level scheduler 22 for the first service flow and that of the second-level scheduler 22 for the second service flow is less than or equal to a maximum bandwidth of the downlink port (the downlink port refers to a port configured to connect to the terminal) of the second network device. For example, a sum of a transmission rate threshold of the SQ-level scheduler for the first service flow and that of the SQ-level scheduler for the second service flow is less than or equal to a maximum bandwidth of the downlink port of the ONT 50; and a sum of a transmission rate threshold of the GQ-level scheduler for the first service flow and that of the GQ-level scheduler for the second service flow is less than or equal to a maximum bandwidth of the downlink port of the OLT 40.

When a sum of transmission rate thresholds of the scheduler for all service flows is less than or equal to a maximum bandwidth of a downlink port of a corresponding network device, it can be ensured that a bandwidth of the downlink port of the network device can meet a bandwidth requirement of a service flow scheduled by the scheduler.

In a plurality of underlying schedulers included in the HQoS model, if a first underlying scheduler 23 is configured to transmit the first service flow through the downlink port of the second network device, and a second underlying scheduler 24 is configured to transmit the second service flow through the downlink port of the second network device, a transmission rate threshold of the first underlying scheduler 23 for the first service flow is less than or equal to the maximum bandwidth of the downlink port of the second network device, and a transmission rate threshold of the second underlying scheduler 24 for the second service flow is less than or equal to the maximum bandwidth of the downlink port of the second network device.

In this embodiment, referring to FIG. 2 and FIG. 4, each underlying scheduler may include one queue, and the queue is for buffering a packet of a service flow of one priority corresponding to the underlying scheduler. For example, the first underlying scheduler 23 may include a first queue for buffering a packet of the first service flow, and the second underlying scheduler 24 may include a second queue for buffering a packet of the second service flow. For each scheduler (to distinguish from the underlying scheduler, referred to as an upstream scheduler) in the first-level scheduler and the second-level scheduler (such as the SQ-level scheduler, the GQ-level scheduler, the VI-level scheduler, and the DP-level scheduler), the upstream scheduler may include a plurality of queues with different priorities. If the upstream scheduler includes a plurality of queues with different priorities, a quantity of queues included in the upstream scheduler may be equal to a quantity of queues included in a network device corresponding to the upstream scheduler, and the upstream scheduler may schedule the plurality of queues with different priorities included in the upstream scheduler. If the upstream scheduler does not include a queue, the upstream scheduler may schedule a queue included in each scheduler connected to the upstream scheduler.

Optionally, in the HQoS model, a quantity of transmission rate thresholds included in a scheduling parameter of each scheduler may be equal to a quantity of queues that need to be scheduled by the scheduler, and each transmission rate threshold is for limiting a transmission rate of a packet in a queue. Therefore, a transmission rate threshold of the scheduler for a service flow of one priority may also be understood as a transmission rate threshold of the scheduler for a queue to which the service flow of the priority belongs.

For example, because each underlying scheduler includes one queue, the scheduling parameter of each underlying scheduler may include a transmission rate threshold. Assuming that the SQ-level scheduler is connected to N underlying schedulers, and the SQ-level scheduler does not include a queue, a scheduling parameter of the SQ-level scheduler may include: N transmission rate thresholds corresponding to N queues included in the N underlying schedulers.

It can be understood that the quantity of queues included in the upstream scheduler may be equal to or different from a quantity of the underlying schedulers connected to the SQ-level scheduler. If the quantity of queues included in the upstream scheduler is less than the quantity of the underlying schedulers connected to the SQ-level scheduler, the upstream scheduler may schedule packets in the plurality of underlying schedulers in one queue.

For example, assuming that each SQ-level scheduler is connected to four underlying schedulers, each upstream scheduler may include four queues with different priorities. Alternatively, if a network device corresponding to an upstream scheduler includes only two queues with different priorities, the upstream scheduler may include only two queues, and each queue in the two queues may correspond to queues in two underlying schedulers. In other words, the upstream scheduler may mix packets in the two underlying schedulers into one queue for scheduling.

Optionally, the transmission rate threshold may include one or more of a PIR, a CAR, a CIR, and an EIR. In addition, an initial value of each of the foregoing rates may be less than or equal to a maximum bandwidth of a downlink port of a network device corresponding to the scheduler.

In a possible implementation, an initial value of a transmission rate threshold of the scheduler for each queue may be equal to a maximum bandwidth of the downlink port. In another possible implementation, the initial value of the transmission rate threshold of the scheduler for each queue may be equal to the maximum bandwidth of the downlink port divided by the quantity of queues that need to be scheduled by the scheduler. In another possible implementation, if the port parameter recorded in the device mapping model further includes: a scheduling proportion of the downlink port of the network device for the queues with different priorities, the first network device may further allocate the maximum bandwidth of the downlink port based on the scheduling proportion, to obtain the transmission rate threshold for each queue. For example, a proportion of the initial values of the transmission rate thresholds of the queues may be equal to the scheduling proportion.

For example, assuming that, in the traffic scheduling system, a maximum bandwidth of a downlink egress port of an OLT 40 is 1 Gbps, and a GQ-level scheduler corresponding to the OLT 40 includes four queues with different priorities, initial values of the GQ-level scheduler for PIRs of the four queues may be configured to ¼Gbps. Alternatively, assuming that a scheduling proportion of the OLT 40 for the four queues with different priorities is 1:2:3:4, the initial values of the GQ-level scheduler for the PIRs of the four queues may be respectively configured as: 0.1 Gbps, 0.2 Gbps, 0.3 Gbps, and 0.4 Gbps. It can be understood that a proportion of the initial values of the GQ-level scheduler for the PIRs of the four queues is equal to the scheduling proportion.

Optionally, for the SQ-level scheduler in the HQoS model, the device mapping model may further record a maximum bandwidth of a network set subscribed by a user corresponding to the SQ-level scheduler. If the maximum bandwidth of the network set is less than the maximum bandwidth of the downlink egress port of the ONT 50, the first network device may determine, based on the maximum bandwidth of the network set, transmission rate thresholds of the SQ-level scheduler for the queues with different priorities. For example, assuming that a maximum bandwidth of a downlink egress port of an ONT 50 is 1 Gbps, but a user of the ONT 50 purchases a network set with a maximum bandwidth of 100 megabits per second (Mbps), a sum of initial values, for PIRs of queues with different priorities, of an SQ-level scheduler corresponding to the ONT 50 may be less than or equal to 100 Mbps.

If the port parameter of the network device that is recorded in the device mapping model further includes: a maximum port buffer, for a scheduler including a queue, a scheduling parameter of the scheduler may further include: a maximum queue buffer of each queue in the scheduler. For a scheduler that does not include a queue, a scheduling parameter of the scheduler may further include: a maximum buffer of the scheduler. A sum of maximum queue buffers of all queues in the scheduler may be less than or equal to the maximum port buffer, and the maximum buffer of the scheduler is also less than or equal to the maximum port buffer. For example, assuming that the SQ-level scheduler includes four queues with different priorities, a sum of maximum queue buffers of the four queues may be less than or equal to a maximum port buffer of the downlink port of the second network device (for example, the ONT 50).

It can be understood that the maximum queue buffer of the queue refers to a maximum buffer that can be occupied by the queue, that is, an upper limit of a total data bulk of packets that can be buffered by the queue.

For N underlying schedulers connected to the SQ-level scheduler, a sum of maximum queue buffers of N queues included in the N underlying schedulers should be less than or equal to a maximum port buffer of a downlink port of a second network device corresponding to the SQ-level scheduler. For example, it is assumed that the underlying schedulers connected to the SQ-level scheduler include a first underlying scheduler 23 and a second underlying scheduler 24, a queue in the first underlying scheduler 23 for buffering a packet of the first service flow is a first queue, and a queue in the second underlying scheduler 24 for buffering a packet of the second service flow is a second queue. In this case, a sum of a maximum queue buffer of the first queue and a maximum queue buffer of the second queue may be less than or equal to the maximum port buffer of the downlink port of the second network device (for example, the ONT 50).

When a sum of maximum queue buffers of queues in each underlying scheduler is less than or equal to the maximum port buffer of the downlink port of the second network device, it can be ensured that a port buffer of the downlink port of the second network device can meet a buffer requirement of a service flow scheduled by the underlying scheduler.

In this embodiment, the first network device may further establish a traffic model of the traffic scheduling system based on the service level requirement model, and further determine a maximum queue buffer of each queue in the scheduler based on the traffic model. An OLT 40 in the traffic scheduling system is used as an example. Assuming that a service flow in the traffic scheduling system is a video flow (for example, the video flows account for more than 80%), the first network device may calculate, based on an M/D/1 model in a queuing theory, a delay of a GQ-level scheduler corresponding to the OLT 40, and further determine, based on the delay, a size of a buffer required by the GQ-level scheduler. The delay is calculated based on the following formula:

$$W(t) = (1-\rho)\sum_{k=0}^{\lfloor \mu t \rfloor}\frac{\left[\lambda\left(\frac{k}{\mu} - t\right)\right]^k}{k!}e^{\lambda\left(t - \frac{k}{\mu}\right)},$$

where

W (t) indicates a delay of the GQ-level scheduler at a time t; λ is a traffic arrival rate and obeys Poisson distribution; μ is a service rate of the OLT 40; ρ is a load rate of the OLT 40, and the load rate ρ meets: ρ=λ/μ; and k is an integer greater than or equal to 0 and less than or equal to [μt], and [μt] indicate to perform a floor operation on μt.

The first network device may estimate the traffic arrival rate λ in the foregoing formula based on proportions of different types of service flows in a scenario in which the OLT 40 is located and a quantity of service flow of each type. In addition, the first network device may further determine the load rate p of the OLT 40 based on an average port load rate of OLTs in an area in which the OLT 40 is located. Assuming that the load rate λ is 50% and the service rate μ is 1 Gbps, the first network device can calculate, based on the foregoing formula, a size of a buffer required by a GQ-level scheduler corresponding to the OLT 40, to configure maximum queue buffers of queues in the GQ-level scheduler.

Optionally, as shown in FIG. 6, the model configuration module 201 of the first network device further includes a parameter configuration unit 2013. The parameter configuration unit 2013 can configure an initial value of a configuration parameter of each scheduler in the HQoS model based on the device mapping model and the service level requirement model.

Step 104: Separately schedule each received service flow using the HQoS model.

In this embodiment, after receiving service flows from a server end through an uplink port of the first network device, the first network device can distinguish different service flows based on two characteristics: users to which the service flows belong and types of the service flows. For example, the first network device may first determine a user to which a received service flow belongs, and then determine a priority of the service flow based on a type of the service flow. After identifying the service flow, the first network device may determine, from the second-level schedulers 22 (for example, the SQ-level scheduler) included in the HQoS model, a target second-level scheduler corresponding to the user to which the service flow belongs, and determine, from a plurality of underlying schedulers connected to the target second-level scheduler, a target underlying scheduler corresponding to the priority of the service flow. Then, the first network device may add a packet of the service flow to the target underlying scheduler for queuing, and schedule the packet in the target underlying scheduler based on the first-level scheduler 21 and the target second-level scheduler of the HQoS model.

Figure 7:
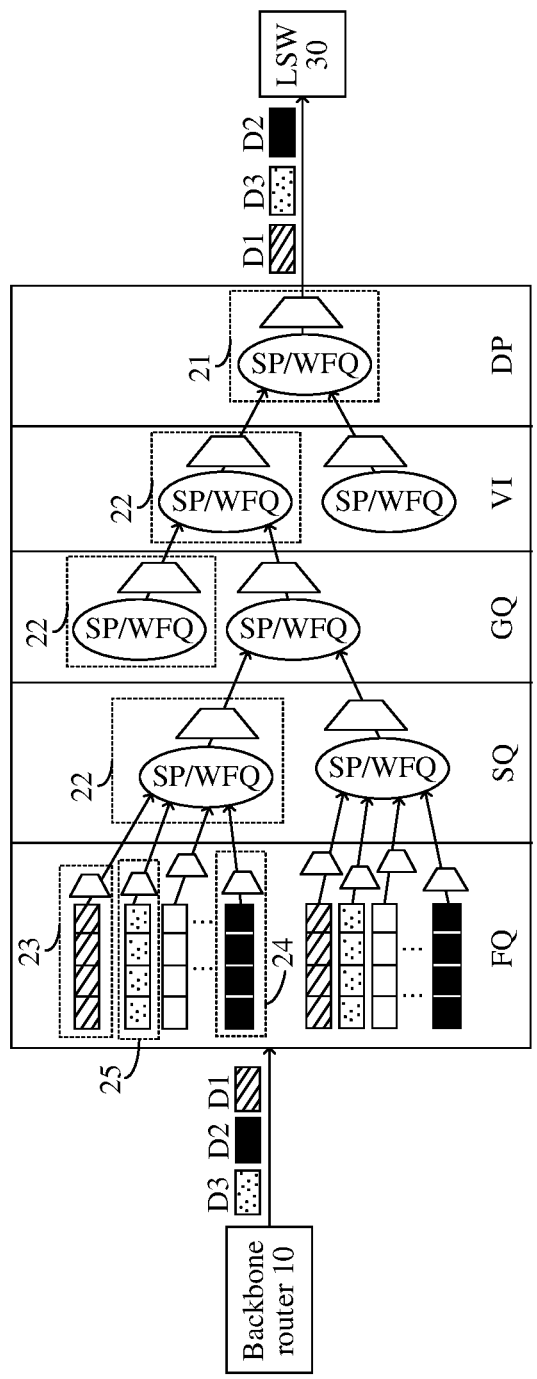
FIG. 7 is a schematic diagram of a structure of a traffic scheduling system according to an embodiment.

For example, referring to FIG. 2 to FIG. 4, it is assumed that the first network device receives a first service flow from a server end 01 and a second service flow from a server end 02. A receiver of the first service flow is the first terminal 03, a receiver of the second service flow is the second terminal 04, the first service flow and the second service flow belong to a same user, and a priority of the first service flow is higher than a priority of the second service flow. In this case, the first network device may add a packet of the first service flow to the first queue in the first underlying scheduler 23, and add a packet of the second service flow to the second queue in the second underlying scheduler 24. Because the two service flows belong to the same user, as shown in FIG. 2, FIG. 4, and FIG. 7, the first underlying scheduler 23 and the second underlying scheduler 24 are connected to a same second-level scheduler 22 (for example, the SQ-level scheduler).

It can be understood that the server end 01 and the server end 02 may be deployed on a same server, or may be deployed on different servers. The first terminal 03 and the second terminal 04 may be a same terminal, or may be different terminals. This is not limited in this embodiment.

After the first network device adds the packet of the service flow to a corresponding underlying scheduler, in a possible implementation, the first network device may schedule the packet in the underlying scheduler sequentially through the second-level scheduler 22 and the first-level scheduler 21. For example, the second-level scheduler 22 may first schedule the packet in the underlying scheduler to the second-level scheduler 22 according to a scheduling policy (for example, SP scheduling or WFQ scheduling) configured for the second-level scheduler 22. Then, the first-level scheduler 21 schedules the packet in the second-level scheduler 22 to the first-level scheduler 21 according to a scheduling policy configured for the first-level scheduler 21.

In another possible implementation, the first network device may schedule the packet in the underlying scheduler sequentially through the first-level scheduler 21 and the second-level scheduler 22. For example, the first-level scheduler 21 may first allocate a scheduling resource (for example, a bandwidth resource) to the second-level scheduler 22 according to the scheduling policy configured for the first-level scheduler 21. The second-level scheduler 22 may further allocate, based on the scheduling resource allocated by the first-level scheduler 21, a scheduling resource to each underlying scheduler connected to the second-level scheduler 22. Finally, the underlying scheduler may transmit the packet to the second-level scheduler 22 based on the allocated scheduling resource.

It can be further understood that a transmission sequence of any service flow in schedulers of all levels included in the HQoS model is as follows: the underlying scheduler, the second-level scheduler 22, and the first-level scheduler 21. In a scenario in which the HQoS model includes a plurality of cascaded second-level schedulers 22, the packet in the plurality of cascaded second-level schedulers 22 is sequentially transmitted from a direction close to the underlying scheduler to a direction away from the underlying scheduler. For example, as shown in FIG. 2, FIG. 4, and FIG. 7, assuming that the HQoS model includes an SQ-level scheduler, a GQ-level scheduler, and a VI-level scheduler that are sequentially cascaded, a transmission sequence of the packet in schedulers of all levels in the HQoS model is as follows: an FQ-level scheduler→the SQ-level scheduler→the GQ-level scheduler→the VI-level scheduler→a DP-level scheduler.

It is assumed that in the HQoS model, a PIR of the first underlying scheduler 23 for the first service flow is 1000 Mbps, and a PIR of the second underlying scheduler 24 for the second service flow is 800 Mbps. In this case, when transmitting the first service flow to the SQ-level scheduler, the first underlying scheduler 23 may limit a data transmission rate of the first service flow to lower than 1000 Mbps, and when transmitting the second service flow to the SQ-level scheduler, the second underlying scheduler 24 may limit a data transmission rate of the second service flow to lower than 800 Mbps.

Refer to FIG. 6, the first network device further includes a processing module 202, a network interface 203, and a power supply 204. The processing module 202 includes a service identification unit 2021, and the network interface 203 is connected to an upstream device (for example, the backbone router 10), and is configured to receive a service flow from a server end (for example, a server end in a DC or a CDN) and transmit the service flow to the service identification unit 2021.

The service identification unit 2021 may identify each received service flow based on a preconfigured service flow identification policy, and determine a priority of each service flow. Then, the service identification unit 2021 may add a packet of the service flow to a corresponding underlying scheduler based on a user to which the service flow belongs and the priority of the service flow. The service flow identification policy may include at least one of the following manners: a technology for defining a QoS attribute based on a differentiated services code point (DSCP), a traffic identification model-based identification technology, a traffic characteristic-based identification technology, and the like. The traffic identification model may be obtained through training based on an AI algorithm.

For example, it is assumed that a first service flow, a second service flow, and a third service flow that are received by the first network device belong to a same user, but have different priorities. In this case, as shown in FIG. 7, the service identification unit 2021 may add a packet D1 of the first service flow to a corresponding first underlying scheduler 23, add a packet D2 of the second service flow to a corresponding second underlying scheduler 24, and add a packet D3 of the third service flow to a corresponding third underlying scheduler 25. The third underlying scheduler 25 is also an FQ-level scheduler.

Step 105: Separately monitor transmission quality of each service flow between the first network device and the terminal.

In this embodiment, the first network device may monitor, in a process of scheduling service flows, the transmission quality of each service flow between the first network device and the terminal in real time. For example, assuming that the service flows scheduled by the first network device includes: a first service flow and a second service flow, the first network device may monitor transmission quality of the first service flow between the first network device and the first terminal 03, and monitor transmission quality of the second service flow between the first network device and the second terminal 04. A measurement parameter of the transmission quality may include one or more of a delay, a packet loss rate, a data transmission rate, and a burst size (BS).

As shown in FIG. 6, the processing module 202 in the first network device further includes a data statistical unit 2022 and a calculating unit 2023. The following uses the first service flow as an example to describe a process in which the first network device monitors the transmission quality of the service flow.

First, the data statistical unit 2022 may take statistics of transmission status data of the first service flow in at least one scheduler. The calculating unit 2023 may determine transmission quality of the first service flow between the first underlying scheduler 23 and the first-level scheduler 21 based on the transmission status data obtained through statistics by the data statistical unit 2022. Because there is a mapping relationship between schedulers of all levels in the HQoS model and network devices of all levels in the traffic scheduling system, the transmission quality of the first service flow between the first underlying scheduler 23 and the first-level scheduler 21 reflects the transmission quality of the first service flow between the first network device and the first terminal 03.

Optionally, the transmission status data may include at least one of the following data: a quantity of newly added packets and a quantity of sent packets in a queue to which the first service flow belongs, a queue length of the queue to which the first service flow belongs, a buffer occupied by the queue to which the first service flow belongs, and a packet loss of the queue to which the first service flow belongs. The packet loss PL of the queue to which the first service flow belongs may meet: PL=P_in−P_out−P_buffer. P_in, P_out, and P_buffer are respectively the quantity of newly added packets in the queue to which the first service flow belongs within statistical duration, the quantity of sent packets, and a quantity of packets buffered in the queue.

In an optional implementation, in a scenario in which each scheduler in the HQoS model includes a plurality of queues with different priorities, as shown in FIG. 2, the data statistical unit 2022 may take statistics of transmission status data of a queue to which the first service flow belongs in each scheduler. For example, packet counting, queue length statistics, buffer occupation statistics, and packet loss statistics may be performed on the queue to which the first service flow belongs. The packet counting refers to: taking statistics of the quantity of newly added packets in the queue to which the first service flow belongs. The calculating unit 2023 may perform calculation on the transmission status data of each scheduler for the first service flow, to obtain the transmission quality of the first service flow on the first network device.

For example, for the delay, the calculating unit 2023 may add queue lengths of queues to which the first service flow belongs in all schedulers, and then determine, based on a total queue length, the delay of transmitting the first service flow between the first network device and the first terminal 03. The delay is in a positive correlation with the total queue length.

For the packet loss rate, the calculating unit 2023 may add the packet losses of the queue to which the first service flow belongs in all schedulers within the statistical duration. Then, a total packet loss is divided by a quantity of newly added packets in the queue to which the first service flow belongs in the first underlying scheduler 23 within the statistical duration, to obtain the packet loss rate of the first service flow within the statistical duration. The statistical duration may be equal to transmission duration of the first service flow, for example, after receiving the packet of the first service flow, the first network device may continuously take statistics of the transmission status data of the first service flow. Alternatively, the statistical duration may be preconfigured fixed duration, for example, the first network device may take statistics of the transmission status data of the first service flow at interval of the statistical duration.

For the data transmission rate, the calculating unit 2023 may divide a total data bulk by unit duration, to obtain the data transmission rate of the first service flow, where the total data bulk is bulk of sent packets in the queue to which the first service flow belongs in the first underlying scheduler 23 with in unit duration. The data transmission rate may be in a unit of bps. The unit duration may be measured at a granularity of seconds. For example, the unit duration may be 1 second. Alternatively, to ensure precision of the data transmission rate obtained through statistics, the unit duration may be measured at a granularity of milliseconds, for example, may be 10 milliseconds.

For the burst size, the calculating unit 2023 may accumulate data bulks of packets that are continuously newly added to the queue to which the first service flow belongs in the first underlying scheduler 23 within the statistical duration, to obtain the burst size. The continuously newly added packet is a packet whose arrival interval from a previous packet is less than a time threshold (for example, 1 microsecond).

It can be understood that, because there are a plurality of schedulers of each level in the HQoS model, refer to FIG. 2, the data statistical unit 2022 may further record an identifier (ID) of each scheduler, to distinguish statistical data of different schedulers.

In another optional implementation, the underlying scheduler in the HQoS model includes a queue, and queues with different priorities are not set in the first-level scheduler 21 and/or the second-level scheduler 22. In this implementation, for each scheduler including a queue, the data statistical unit 2022 may take statistics of transmission status data of the queue to which the first service flow belongs in the scheduler. For example, if in the HQoS model, only the underlying scheduler includes a queue, the data statistical unit 2022 may take statistics of transmission status data of the queue only in the underlying scheduler.

It can be understood that, because schedulers of all levels in the HQoS model can schedule the packets in the underlying scheduler based on a specific scheduling sequence, in this implementation, a statistical result of transmission status data of queues in the scheduler including a queue can accurately reflect an overall scheduling status of the first service flow in the HQoS model.

For example, assuming that in the HQoS model, only the underlying scheduler includes a queue, the calculating unit 2023 may determine the delay of the first service flow between the first network device and the first terminal 03 based on the queue length of the queue (that is, the first queue) to which the first service flow belongs in the first underlying scheduler 23. The calculating unit 2023 may divide the packet loss in the first queue in the first underlying scheduler 23 by the quantity of newly added packets in the first queue, to obtain the packet loss rate of the first service flow between the first network device and the first terminal 03. In addition, the calculating unit 2023 may divide the quantity of sent packets in the first queue within the statistical duration by the statistical duration, to obtain the data transmission rate of the first service flow between the first network device and the first terminal 03.

For example, it is assumed that in the traffic scheduling system, a maximum bandwidth of a downlink port of an ONT 50 having a wireless WI-FI function is 1 Gbps, and a user of the ONT 50 purchases a network bandwidth set of 100 Mbps. If the user is watching an on-demand video using the second terminal 04, the traffic scheduling system needs to schedule a video on demand service flow from the server end 02 to the second terminal 04. The following uses an example in which the second terminal 04 is far away from the ONT 50, and a data transmission rate of transmitting the video on demand service flow by the ONT 50 to the second terminal 04 reaches to a maximum of 20 Mbps.

After receiving the video on demand service flow through the network interface 203, the service identification unit 2021 in the first network device may add a packet of the video on demand service flow to a queue in a corresponding underlying scheduler (for example, the second queue in the second underlying scheduler 24) for queuing. Assuming that in the HQoS model, only the underlying scheduler includes a queue, the data statistical unit 2022 may take statistics of a quantity of sent packets in the second queue in the second underlying scheduler 24 within unit duration, and divide a value obtained through statistics by the unit duration, to obtain a data transmission rate of the video on demand service flow between the first network device and the second terminal 04. For example, if statistics are performed in unit duration of a second level granularity, the calculating unit 2023 may obtain, through calculation, the data transmission rate of the video flow that is 4 Mbps. If statistics are performed in unit duration of a millisecond level granularity, the calculating unit 2023 may obtain, through calculation, the data transmission rate of the video flow that may reach to a maximum of 20 Mbps.

It can be understood that, in addition to monitoring end-to-end transmission quality of the service flow, the first network device may further determine, based on transmission status data of the service flow in each scheduler, transmission quality of the service flow in a network device corresponding to the scheduler.

It can be further understood that, in this embodiment, the transmission quality of each service flow that is monitored by the first network device may be further visually displayed. For example, the first network device may send, to a controller, a measurement parameter for measuring the transmission quality of each service flow for display. Alternatively, the first network device may be connected to a display device, and the first network device may display the measurement parameter of the transmission quality of each service flow using the display device.

Step 106: Detect whether the transmission quality of the first service flow meets a service level requirement corresponding to the first service flow.

In this embodiment, after detecting the transmission quality of the first service flow between the first network device and the first terminal, the first network device may compare the transmission quality with the service level requirement of the first service flow, to determine whether the transmission quality of the first service flow meets the service level requirement of the first service flow. If the first network device determines that the transmission quality of the first service flow does not meet the service level requirement of the first network device, the first network device may perform step 107. If the first network device determines that the transmission quality of the first service flow meets the service level requirement of the first network device, the first network device may continue to perform step 105, for example, continue to monitor the transmission quality of the first service flow.

If the service level requirement of the first service flow includes an upper limit of a delay, when detecting that an end-to-end delay of the first service flow is greater than the upper limit of the delay, the first network device may determine that the transmission quality of the first service flow does not meet the service level requirement of the first service flow. If the service level requirement of the first service flow includes an upper limit of a packet loss rate, when detecting that an end-to-end packet loss rate of the first service flow is greater than the upper limit of the packet loss rate, the first network device may determine that the transmission quality of the first service flow does not meet the service level requirement of the first service flow. If the service level requirement of the first service flow includes a lower limit of a data transmission rate, when detecting that an end-to-end data transmission rate of the first service flow is less than the lower limit of the data transmission rate, the first network device may determine that the transmission quality of the first service flow does not meet the service level requirement of the first service flow.

For example, referring to FIG. 6, the processing module 202 may further include a transmission quality monitoring unit 2024. The transmission quality monitoring unit 2024 may be configured to detect whether the transmission quality of the first service flow meets the service level requirement of the first service flow. It is assumed that the first service flow is a service flow of a game or a video conference, and an upper limit of a delay in the service level requirement of the first service flow is 20 ms. If the first network device determines the delay of the first service flow between the first network device and the first terminal 03 is 30 ms, because the delay is greater than the upper limit 20 ms of the delay, the first network device may perform step 107.

Step 107: Detect whether the second service flow meets a condition of traffic shaping.

In this embodiment, after detecting that the transmission quality of the first service flow with a higher priority does not meet the service level requirement corresponding to the first service flow, the first network device may detect whether the second service flow with a lower priority meets the condition of traffic shaping. If the first network device determines that the second service flow meets the condition of traffic shaping, the first network device may perform step 108, for example, perform traffic shaping on the second service flow. If determining that the second service flow does not meet the condition of traffic shaping, the first network device may perform step 109.

Optionally, the condition of traffic shaping may include at least one of the following conditions: a transmission rate threshold of the HQoS model for the second service flow is greater than an average data transmission rate of the second service flow, and a current data transmission rate of the second service flow is greater than a peak threshold of a data transmission rate of the second service flow. It can be understood from the description in step 105 that the current data transmission rate of the second service flow is measured by the first network device. For example, the first network device may obtain the current data transmission rate of the second service flow through calculation based on transmission status data of the second service flow in the HQoS model.

In this embodiment, the first network device can monitor the data transmission rate of the second service flow in real time within the statistical duration. Therefore, it can be understood that the average data transmission rate of the second service flow may refer to an average value of the data transmission rate of the second service flow within the statistical duration.

If the transmission rate threshold of the HQoS model for the second service flow is less than or equal to the average data transmission rate of the second service flow, the first network device may determine that service experience of the second service flow is severely affected if the transmission rate threshold of the second service flow is continuously reduced. Therefore, the first network device may use, as one of the conditions for traffic shaping, that the transmission rate threshold is greater than the average data transmission rate.

If the current data transmission rate of the second service flow is greater than the peak threshold of the data transmission rate of the second service flow, the first network device may determine that a traffic burst currently exists in the second service flow. The traffic burst has the following characteristics: data is sent at a high data transmission rate in a short time period (for example, 10 milliseconds), and then data is stopped to be sent in a long time period, or data is sent at a low data transmission rate. In an example in which the second service flow is a video on demand service flow, if the unit duration for calculating the data transmission rate is 10 milliseconds, a real-time data transmission rate of the video on demand service flow in specific statistical duration may reach a maximum of 350 Mbps. However, an average data transmission rate of the video on demand service flow within the statistical duration is only about 3 Mbps to 5 Mbps. The statistical duration may be measured at a granularity of seconds.

Because the traffic burst severely preempts a bandwidth resource of another service flow, traffic shaping is performed on the service flow in which the traffic burst exists, thereby effectively improving transmission quality of the another service flow. Correspondingly, the first network device may further use, as one of the conditions for traffic shaping, that the current data transmission rate is greater than the peak threshold of the data transmission rate of the second service flow. In addition, to make it convenient for the first network device to accurately detect whether the traffic burst currently exists in the second service flow, the unit duration for calculating the data transmission rate of the second service flow in step 105 may be measured at a granularity of milliseconds.

Optionally, the peak threshold of the data transmission rate of the second service flow may be determined based on a type of the second service flow. In addition, peak thresholds of data transmission rates of different types of service flows may be different. It can be understood that a peak threshold of a data transmission rate of each service flow may further be determined based on a maximum port buffer of a downlink port of each level of network device, and a larger maximum port buffer indicates a higher peak threshold of the data transmission rate of the service flow.

For example, the transmission rate threshold includes a PIR. If detecting that the PIR of the HQoS model for the second service flow is less than or equal to the average data transmission rate of the second service flow, the first network device may determine that the second service flow does not meet the conditions of traffic shaping, and may perform step 109. Alternatively, if detecting that the current data transmission rate of the second service flow is less than the peak threshold of the data transmission rate of the second service flow, the first network device may determine that no traffic burst currently exists in the second service flow, further determine that the second service flow does not meet the condition of traffic shaping, and may perform step 109.

If detecting that the PIR of the second service flow is greater than the average data transmission rate of the second service flow, and the peak value of the data transmission rate of the second service flow is greater than the peak threshold of the second service flow, the first network device may determine that the second service flow meets the condition of traffic shaping, and may perform step 108.

In this embodiment, priorities of different service flows may be determined based on a delay requirement, for example, a service flow with a higher delay requirement has a higher priority. Correspondingly, an upper limit of a delay in the service level requirement of the first service flow may be less than an upper limit of a delay in the service level requirement of the second service flow. A service flow having a higher delay requirement (that is, a high real-time requirement) may also be referred to as a delay sensitive service flow, and a service flow having a lower delay requirement (that is, a low real-time requirement) may also be referred to as a non-delay sensitive service flow. Therefore, in this embodiment, a priority of the service flow of a delay sensitive service may be higher, and a priority of the service flow of a non-delay sensitive service may be lower.

Table 1 shows traffic sizes and real-time requirements of some types of service flows in the traffic scheduling system. Refer to Table 1, for an interactive service flow with heavy traffic, such as a video conference and interactive virtual reality (VR), a service level requirement usually includes a high bandwidth, a low packet loss rate, and a low delay. For non-interactive service flows with heavy traffic, such as video on demand and file download, a service level requirement includes a high bandwidth, but there is no strict requirement on the packet loss rate and the delay. For interactive service flows with light traffic, such as a voice and a game, a service level requirement usually includes a low packet loss rate and a low delay, but there is no strict requirement on the bandwidth. For service flows with light traffic, such as social chat and email, there are no strict requirements on the bandwidth, the packet loss rate, and the delay.

TABLE 1

| Service flow | Traffic size | Real-time requirement |
| --- | --- | --- |
| Video conference and interactive VR | Large | High |
| Voice and game | Small | High |
| Video on demand and file download | Large | Low |

TABLE 1-continued

| Service flow | Traffic size | Real-time requirement |
|---|---|---|
| Social chat and email | Small | Low |

Research shows that a quantity of the service flows with heavy traffic (such as a video conference and interactive VR) on the network is small, but the service flows with heavy traffic occupy most of the network bandwidth. For example, Table 2 shows distribution characteristics of traffic output by a 10G port of a backbone router in a time period whose duration is 48 seconds. The 10G port refers to a downlink egress port with a bandwidth of 10 gigabits per second (Gbps). It is assumed that the 10G port outputs $1.5 \times 10^6$ service flows in the time period. Refer to Table 2, it can be understood that, in the $1.5 \times 10^6$ service flows, a quantitative proportion of service flows (hereinafter referred to as large flows) with total traffic greater than 0.1 megabyte (Mbyte, MB) within 48 s is only about 1.46%. However, a bandwidth proportion of a network bandwidth occupied by these large flows reaches to 89.21%. A bandwidth proportion of a network bandwidth occupied by other service flows whose quantitative proportion is about 98.5% is only about 10%.

TABLE 2

| Total traffic (MB) | Quantity | Quantitative proportion | Bandwidth proportion |
|---|---|---|---|
| >0.1 | 22000 | 1.46% | 89.21% |

Among the various types of service flows shown in Table 1, the video on demand service flow and the file download service flow are typical large flows, and have characteristics such as a high data transmission rate, long duration, a large packet interval, and sending traffic in a burst mode (that is, a traffic burst exists). The traffic burst severely preempts bandwidth resources of other service flows. Therefore, the large flows in the traffic scheduling system are a main cause for network congestion and network service quality deterioration.

In a traffic scheduling system in the related art, after receiving different types of service flows, the network device does not perform differentiated processing, in other words, the network device mixes the delay sensitive service flow and a non-delay sensitive service flow in a same queue for scheduling. As a result, the delay sensitive service flow cannot be preferentially processed, a service level requirement of the delay sensitive service flow cannot be ensured, and transmission quality of the delay sensitive service flow may deteriorate due to impact of the non-delay sensitive service flow. For example, in a home broadband scenario, traffic of an online game is small. If the online game service flow is mixed with the large flows such as the video on demand service flow or the file download service flow in a same queue for scheduling, transmission quality of the online game is severely affected. For example, problems such as a high delay and a high packet loss rate may occur in the traffic of the online game, severely affecting game experience of a user.

However, in this embodiment, the priority of the service flow may be determined based on the delay requirement of the service flow, and traffic shaping may be performed on the service flow with a lower priority when the service level requirement of the service flow with a higher priority is not met, so that the service level requirement of the delay sensitive service flow can be preferentially ensured.

It can be understood that, in addition to the delay requirement, the priority of the service flow may further be determined based on another parameter in the service level requirement, for example, may further be determined based on a requirement for the packet loss rate. This is not limited in this embodiment.

Step 108: Adjust, to a first threshold, the transmission rate threshold of the HQoS model for the second service flow.

After determining that the second service flow meets the condition of traffic shaping, the first network device may adjust, to a first threshold, the transmission rate threshold of the HQoS model for the second service flow, where the first threshold is less than the current data transmission rate of the second service flow, so that traffic shaping can be performed on the second service flow.

Optionally, to prevent traffic shaping from affecting service experience of the second service flow, the first threshold may be greater than or equal to the average data transmission rate of the second service flow. For example, the first threshold may be 1.5 times greater than the average data transmission rate of the second service flow.

As described above, the transmission rate threshold of the second service flow may include one or more of the PIR, the CAR, the CIR, and the EIR. If the transmission rate threshold includes a plurality of rates in the PIR, the CAR, the CIR, and the EIR, the first network device needs to separately adjust each rate in the transmission rate threshold. In a possible implementation, the first network device may adjust all the plurality of rates in the transmission rate threshold to a same first threshold, in other words, adjusted rates is equal to each other. In another possible implementation, the first network device may separately adjust the plurality of rates in the transmission rate threshold to respective corresponding first thresholds, that is, adjusted rates may have different values.

Figure 8:
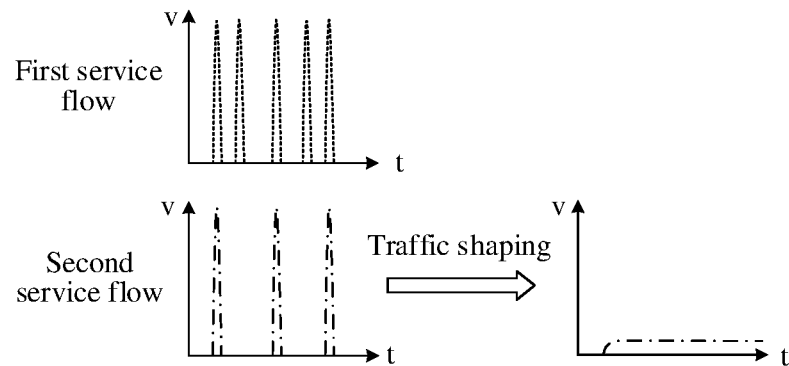
FIG. 8 is a schematic diagram of traffic shaping according to an embodiment.

FIG. 8 is a schematic diagram of data transmission rates of a first service flow and a second service flow according to an embodiment. In FIG. 8, a horizontal axis indicates a time t, and a vertical axis indicates a data transmission rate v. Referring to FIG. 8, it can be understood that, when the first network device does not perform traffic shaping on the second service flow, a traffic burst exists in the second service flow. In addition, a time period of the traffic burst in the second service flow overlaps with a time period of a traffic burst in the first service flow, severely affecting service experience of the first service flow. After performing traffic shaping on the second service flow, the first network device may implement smoothing on the data transmission rate of the second service flow, so that network bandwidth can give way to the first service flow with a higher priority.

The first-level scheduler 21, the second-level scheduler 22, and the second underlying scheduler 24 in the HQoS model may limit the data transmission rate of the second service flow. Therefore, in this embodiment, the first network device may adjust, to the first threshold, a transmission rate threshold of at least one scheduler of the first-level scheduler 21, the second-level scheduler 22, and the second underlying scheduler 24 for the second service flow.

In an optional implementation, the first network device may adjust, to the first threshold, a transmission rate threshold of the second underlying scheduler 24 for the second service flow. The second underlying scheduler 24 only needs to schedule a packet in one queue included in the second underlying scheduler 24, while both the first-level scheduler 21 and the second-level scheduler 22 need to schedule packets in a plurality of schedulers connected to the first-level scheduler 21 and the second-level scheduler 22. Therefore, impact on another service flow can be effectively reduced only by adjusting the transmission rate threshold of the second underlying scheduler 24 for the second service flow.

For example, it is assumed that in the traffic scheduling system, a downlink of an ONT 50 having a wireless Wi-Fi function is at a rate of 1 Gbps, a first terminal 03 wirelessly connected to the ONT 50 is holding a video conference, and a second terminal 04 wirelessly connected to the ONT 50 is playing an on-demand video. In this case, the traffic scheduling system needs to schedule a video flow (that is, the first service flow) of the video conference from a server end 01 to the first terminal 03, and needs to schedule a video on demand service flow (that is, the second service flow) from a server end 02 to the second terminal 04. If there is heavy instantaneous overstocking in the video flow of the video conference due to a traffic burst in the video on demand service flow, the transmission quality monitoring unit 2024 in the first network device may detect that a delay of the video flow of the video conference cannot meet a service level requirement of the video conference flow. Correspondingly, the traffic shaping unit 2025 in the processing module 202 may perform traffic shaping on the video on demand service flow. For example, if the calculating unit 2023 obtains, through calculation, an average data transmission rate of the video on demand service flow that is 4 Mbps, the traffic shaping unit 2025 may adjust, to 4 Mbps, a PIR of the second underlying scheduler 24 for the video on demand service flow. In this way, smoothing on the video on demand flow is implemented, so that all network bandwidths can give way to the video flow of the delay sensitive video conference.

In the foregoing manner, it can be further ensured that a data transmission rate of the video on demand flow sent by the first network device is stable below 4 Mbps. In this way, even if the downstream LSW 30, OLT 40, and ONT 50 do not have capabilities of service flow identification and QoS differentiated scheduling, it can be ensured that when the traffic-shaped video on demand flow passes through the downstream network devices of all levels, the network bandwidth can give way to the video conference flow, thereby ensuring an end-to-end service level requirement of the video conference flow. In addition, when the video on demand flow is sent at 4 Mbps, a bit rate of the video flow is also met, and experience of the video service is not deteriorated.

In another optional implementation, the first network device may determine a target scheduler on which network congestion occurs during transmission of the first service flow, and adjust, to the first threshold, a transmission rate threshold of the target scheduler for the second service flow. The target scheduler is the first-level scheduler 21 or the second-level scheduler 22. The transmission rate threshold of the target scheduler for the second service flow is adjusted, so that congestion occurring when the target scheduler transmits the first service flow can be effectively alleviated, thereby improving the transmission quality of the first service flow.

In a scenario in which both the first-level scheduler 21 and the second-level scheduler 22 in the HQoS model include queues, the first network device may compare transmission status data of queues to which the first service flow belongs in the schedulers, and determine, based on the transmission status data, the target scheduler on which network congestion occurs during transmission of the first service flow.

For example, the first network device may compare queue lengths of the queues to which the first service flow belongs in the schedulers, and determine a scheduler with a longest queue length as the target scheduler on which network congestion occurs. Alternatively, the first network device may compare packet loss rates of the queues to which the first service flow belongs in the schedulers, and determine a scheduler with a highest packet loss rate as the target scheduler on which network congestion occurs.

In a scenario in which only some of the schedulers in the first-level scheduler 21 and the second-level scheduler 22 include queues, the first network device may determine, based on topology structures of the scheduler and transmission status data of queues in the schedulers that have queues, the target scheduler on which network congestion occurs during transmission of the first service flow.

For example, it is assumed that an SQ-level scheduler does not include a queue, but a data bulk of a packet buffered in each queue in N underlying schedulers connected to the SQ-level scheduler is greater than a maximum queue buffer of the queue, or a sum of data bulks of packets buffered in the queues is greater than a maximum buffer of the SQ-level scheduler, or a packet loss rate of each queue is greater than a packet loss rate threshold. In this case, the first network device may determine that the SQ-level scheduler is the target scheduler on which network congestion occurs.

For example, it is assumed that an SQ-level scheduler is connected to four underlying schedulers, maximum queue buffers of queues in the four underlying schedulers are respectively 100 bytes, 200 bytes, 300 bytes, and 400 bytes, and a maximum buffer of the SQ-level scheduler is 800 bytes. If data bulks of packets actually buffered in the four queues at a moment are respectively 99 bytes, 199 bytes, 299 bytes, and 399 bytes, because a sum of data bulks of packets buffered in the four queues is greater than the maximum buffer of the SQ-level scheduler, the first network device may determine that the SQ-level scheduler is the target scheduler on which network congestion occurs during transmission of the first service flow.

Step 109: Adjust, to a second threshold, a transmission rate threshold of the HQoS model for a third service flow.

In this embodiment, the service flows carried in the traffic scheduling system may further include the third service flow. A priority of the third service flow is higher than that of the second service flow, and lower than that of the first service flow. Correspondingly, in step 104, the first network device may further schedule the third service flow based on the HQoS model.

In step 107, if detecting that the second service flow does not meet the condition of traffic shaping, the first network device may adjust, to the second threshold, the transmission rate threshold of the HQoS model for the third service flow, and the second threshold is less than a current data transmission rate of the third service flow, so that traffic shaping can be performed on the third service flow. For an implementation process of step 109, refer to the foregoing step 108. Details are not described herein again.

It can be understood that, after detecting that the transmission quality of the first service flow with a higher priority does not meet the service level requirement of the first service flow, the first network device may sequentially detect, in ascending order of priorities, whether each service flow with a lower priority meets the condition of traffic shaping. If it is detected that any service flow with a lower priority meets the condition of traffic shaping, a transmission rate threshold of the HQoS model for the service flow with a lower priority may be adjusted to be lower, to implement traffic shaping on the service flow with a lower priority. In other words, the first network device may perform step 109 after determining that the third service flow meets the condition of traffic shaping.

It can be further understood that, in this embodiment, for each service flow received by the first network device, the first network device may determine, in the manner shown in step 106, whether transmission quality of the service flow meets a service level requirement corresponding to the service flow. In addition, when detecting that transmission quality of any service flow does not meet a service level requirement corresponding to the service flow, the first network device may perform traffic shaping on a service flow with a lower priority with reference to the method shown in step 107 to step 109.

It should be understood that a sequence of steps in the service flow scheduling method provided in this embodiment may be properly adjusted, and steps may be correspondingly added or deleted based on a situation. For example, the foregoing step 102 may be performed before step 101. Alternatively, the foregoing step 101 and step 102 may be deleted based on a situation, and correspondingly, initial values of scheduling parameters of the schedulers in the HQoS model may be directly configured. Alternatively, the foregoing step 107 and step 109 may be deleted based on a situation, that is, the first network device may directly perform traffic shaping on the second service flow.

In conclusion, this embodiment provides the service flow scheduling method. When detecting that the transmission quality of the service flow with a higher priority does not meet the service level requirement corresponding to the service flow, the first network device may adjust, to the first threshold, the transmission rate threshold of the HQoS model for the service flow with a lower priority. Because the first threshold is less than the current data transmission rate of the service flow with a lower priority, traffic shaping on the service flow with a lower priority can be implemented. Further, the bandwidth of the downlink port of the first network device may give way to the service flow with a higher priority, to ensure that the service level requirement of the service flow with a higher priority can be preferentially met.

Because the first network device is further connected to the terminal through the second network device, after the first network device performs traffic shaping on the service flow with a lower priority, the service flow with a lower priority can be transmitted to the downstream second network device at a stable data transmission rate. That is, the traffic burst does not occur in the service flow with a lower priority in the downstream second network device. Therefore, even if the downstream second network device does not have functions of service flow identification and differentiated QoS scheduling, the service flow with a lower priority can be prevented from preempting a bandwidth resource of the service flow with a higher priority due to the traffic burst. In other words, the first network device performs traffic shaping on the service flow with a lower priority, to ensure that the service flow with a higher priority can obtain a larger bandwidth when passing through the downstream second network device, thereby effectively ensuring the service level requirement of the service flow with a higher priority.

In addition, because the traffic burst can be avoided in the service flow with a lower priority in the downstream second network device, a buffer requirement for the second network device can be reduced, thereby reducing device costs of the second network device. In addition, because the downstream second network device does not need to have the functions of service flow identification and differentiated QoS scheduling, the solution provided in this embodiment can be implemented without updating the second network device that does not have the foregoing functions in a live network. That is, the solution provided in this embodiment has high application flexibility and compatibility.

In addition, when the first network device performs traffic shaping on the service flow with a lower priority, it can be ensured that a reduced transmission rate threshold is greater than or equal to the average data transmission rate of the service flow with a lower priority. Therefore, impact on service experience of the service flow with a lower priority can be avoided.

Figure 9:
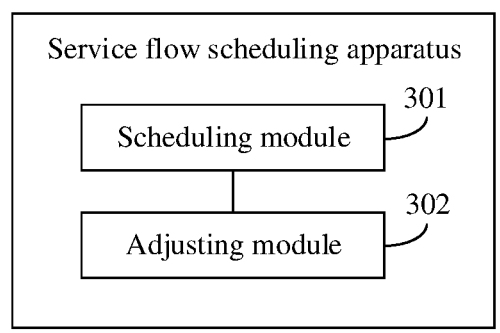
FIG. 9 is a schematic diagram of a structure of a service flow scheduling apparatus according to an embodiment.

FIG. 9 is a schematic diagram of a structure of a service flow scheduling apparatus according to an embodiment. The scheduling apparatus may be used in the first network device provided in the foregoing method embodiment, and may be configured to implement the service flow scheduling method provided in the foregoing embodiment. For example, the scheduling apparatus may implement functions of the first device in FIG. 5 and perform the method shown in FIG. 5. The apparatus may alternatively be the SR/BRAS in FIG. 1 to FIG. 4. As shown in FIG. 9, the service flow scheduling apparatus includes:

a scheduling module 301, configured to separately schedule a first service flow and a second service flow based on an HQoS model, where a priority of the first service flow is higher than a priority of the second service flow; and for function implementation of the scheduling module 301, refer to related descriptions of step 104 in the foregoing method embodiment; and an adjusting module 302, configured to adjust, to a first threshold, a transmission rate threshold of the HQoS model for the second service flow when transmission quality of the first service flow does not meet a service level requirement corresponding to the first service flow, where the first threshold is less than a current data transmission rate of the second service flow. In other words, the adjusting module 302 may be configured to perform traffic shaping on the second service flow.

For function implementation of the adjusting module 302, refer to related descriptions of step 108 in the foregoing method embodiment. In addition, the adjusting module 302 may be configured to implement functions of the transmission quality monitoring unit 2024 and the traffic shaping unit 2025 in the embodiment shown in FIG. 6.

In an implementation, the first threshold may greater than or equal to an average data transmission rate of the second service flow.

In an implementation, the adjusting module 302 may be configured to: adjust, to the first threshold, the transmission rate threshold of the HQoS model for the second service flow when the transmission quality of the first service flow does not meet the service level requirement corresponding to the first service flow and the current data transmission rate of the second service flow is greater than a peak threshold of a data transmission rate of the second service flow.

For function implementation of the adjusting module 302, refer to related descriptions of step 107 in the foregoing method embodiment. In addition, the adjusting module 302 may be further configured to implement functions of the data statistical unit 2022 and the calculating unit 2023 in the embodiment shown in FIG. 6.

In an implementation, the transmission rate threshold of the second service flow may include one or more of a PIR, a CAR, a CIR, and an EIR.

In an implementation, the first network device may be connected to a terminal through a second network device. Correspondingly, the HQoS model may include: a first-level scheduler corresponding to a downlink port of the first network device, a second-level scheduler corresponding to a downlink port of the second network device, a first underlying scheduler configured to transmit the first service flow through the downlink port of the second network device, and a second underlying scheduler configured to transmit the second service flow through the downlink port of the second network device.

In an implementation, the adjusting module 302 may be configured to: adjust, to the first threshold, a transmission rate threshold of at least one scheduler of the first-level scheduler, the second-level scheduler, and the second underlying scheduler for the second service flow.

In an implementation, the adjusting module 302 may be configured to determine a target scheduler on which network congestion occurs during transmission of the first service flow, and adjust, to the first threshold, a transmission rate threshold of the target scheduler for the second service flow. The target scheduler may be the first-level scheduler or the second-level scheduler.

In an implementation, a sum of a transmission rate threshold of the first-level scheduler for the first service flow and that of the first-level scheduler for the second service flow is less than or equal to a maximum bandwidth of the downlink port of the first network device, and a sum of a transmission rate threshold of the second-level scheduler for the first service flow and that of the second-level scheduler for the second service flow is less than or equal to a maximum bandwidth of the downlink port of the second network device.

In an implementation, a transmission rate threshold of the first underlying scheduler for the first service flow is less than or equal to the maximum bandwidth of the downlink port of the second network device; and a transmission rate threshold of the second underlying scheduler for the second service flow is less than or equal to the maximum bandwidth of the downlink port of the second network device.

In an implementation, the first underlying scheduler includes a first queue for buffering a packet of the first service flow, and the second underlying scheduler includes a second queue for buffering a packet of the second service flow; and a sum of a maximum queue buffer of the first queue and a maximum queue buffer of the second queue is less than or equal to a maximum port buffer of the downlink port of the second network device.

In an implementation, an upper limit of a delay in the service level requirement of the first service flow may be less than an upper limit of a delay in a service level requirement of the second service flow. That is, the priority of the service flow may be classified based on a delay requirement of the service flow, and a service flow with a higher delay requirement may have a higher priority.

In an implementation, the scheduling module 301 may be further configured to schedule a third service flow based on the HQoS model, where a priority of the third service flow is higher than the priority of the second service flow and lower than the priority of the first service flow.

The adjusting module 302 may be further configured to: adjust, to a second threshold, a transmission rate threshold of the HQoS model for the third service flow when the transmission rate threshold of the second service flow is less than or equal to the average data transmission rate of the second service flow or when the current data transmission rate of the second service flow is less than or equal to the peak threshold of the data transmission rate of the second service flow, where the second threshold is less than a current data transmission rate of the third service flow.

In other words, if determining that the second service flow does not meet a condition of traffic shaping, the adjusting module 302 may perform traffic shaping on the third service flow with a second lowest priority. For function implementation of the adjusting module 302, refer to related descriptions of step 109 in the foregoing method embodiment.

Thus, this embodiment provides the service flow scheduling apparatus. When detecting that the transmission quality of the service flow with a higher priority does not meet the service level requirement corresponding to the service flow, the apparatus may adjust, to the first threshold, the transmission rate threshold of the HQoS model for the service flow with a lower priority. Because the first threshold is less than the current data transmission rate of the service flow with a lower priority, traffic shaping on the service flow with a lower priority can be implemented. Further, the bandwidth of the downlink port of the first network device may give way to the service flow with a higher priority, to ensure that the service level requirement of the service flow with a higher priority can be preferentially met.

A person skilled in the art may clearly understand that, for simple and clear description, for work processes of the foregoing described service flow scheduling apparatus and the modules, reference may be made to corresponding process in the foregoing method embodiment, and details are not described herein again.

It should be understood that the service flow scheduling apparatus provided in this embodiment may alternatively be implemented by an application-specific integrated circuit (ASIC) or a programmable logic device (PLD). The PLD may be a complex program logic device ( ) a field-programmable gate array (FPGA), a generic array logic (GAL), or any combination thereof. Alternatively, the service flow scheduling method provided in the foregoing method embodiment may be implemented by software. When the service flow scheduling method provided in the foregoing method embodiments is implemented by software, the modules in the service flow scheduling apparatus provided in this embodiment may alternatively be software modules.

Figure 10:
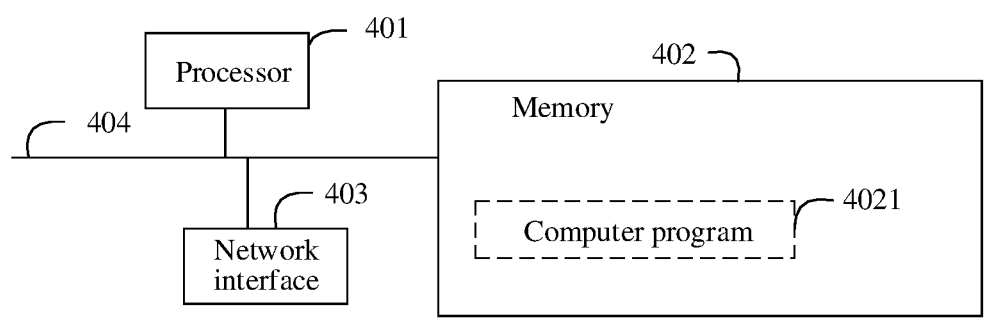
FIG. 10 is a schematic diagram of a structure of another service flow scheduling apparatus according to an embodiment.

FIG. 10 is a schematic diagram of a structure of another service flow scheduling apparatus according to an embodiment. For example, the apparatus may be the SR/BRAS in FIG. 1 to FIG. 4. The service flow scheduling apparatus may be used in the first network device provided in the foregoing embodiment, to execute, for example, the method performed by the first device shown in FIG. 5 and the function of the first device. Refer to FIG. 10, the service flow scheduling apparatus may include: a processor 401, a memory 402, a network interface 403, and a bus 404. The bus 404 is configured to connect the processor 401, the memory 402, and the network interface 403. The network interface 403 is configured to implement a communication connection to another device. The memory 402 stores a computer program, and the computer program is used to implement various application functions.

It should be understood that, in this embodiment, the processor 401 may be a CPU, or the processor 401 may be another general-purpose processor, a digital signal processor (DSP), an application-specific integrated circuit (ASIC), a field programmable gate array (FPGA), a GPU or another programmable logic device, a discrete gate or a transistor logic device, a discrete hardware component, or the like. The general-purpose processor may be a microprocessor, any conventional processor, or the like.

The memory 402 may be a volatile memory or a non-volatile memory, or may include a volatile memory and a non-volatile memory. The nonvolatile memory may be a ROM, a programmable read-only memory (PROM), an erasable programmable read-only memory (EPROM), an EEPROM, or a flash memory. The volatile memory may be a RAM, and serves as an external cache. Through an example but not a limiting description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

The bus 404 may further include a power bus, a control bus, a status signal bus, and the like, in addition to a data bus. However, for the purpose of clear descriptions, various buses are all marked as the bus 404 in the figure.

The processor 401 is configured to execute the computer program stored in the memory 402. The processor 401 executes the computer program 4021 to implement the service flow scheduling method provided in the foregoing method embodiment, for example, executes the method performed by the first network device shown in FIG. 5. In an implementation, the processor 401 is configured to separately schedule a first service flow and a second service flow based on an HQoS model, where a priority of the first service flow is higher than a priority of the second service flow; and adjust, to a first threshold, a transmission rate threshold of the HQoS model for the second service flow when transmission quality of the first service flow does not meet a service level requirement corresponding to the first service flow, where the first threshold is less than a current data transmission rate of the second service flow.

Figure 11:
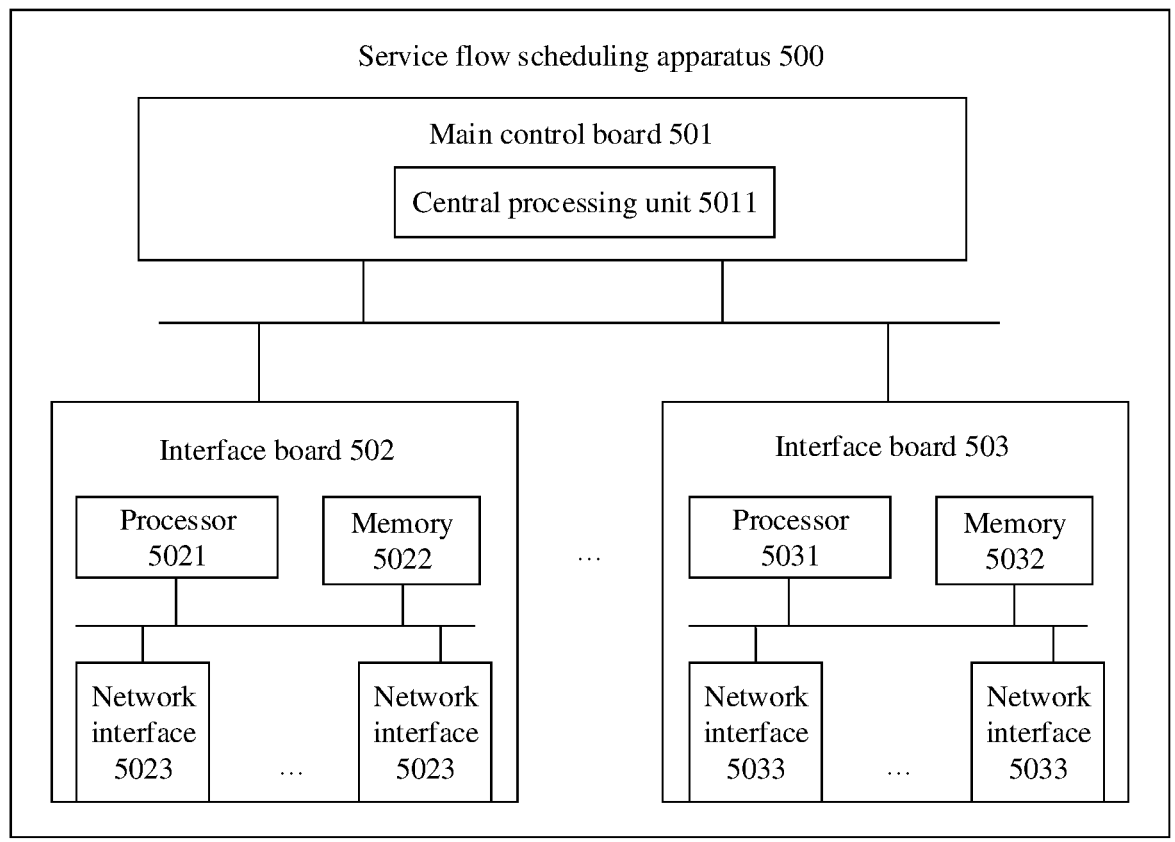
FIG. 11 is a schematic diagram of a structure of still another service flow scheduling apparatus according to an embodiment.

FIG. 11 is a schematic diagram of a structure of another service flow scheduling apparatus according to an embodiment. For example, the apparatus may be the SR/BRAS in FIG. 1 to FIG. 4. The service flow scheduling apparatus may be used in the first network device provided in the foregoing embodiment, to execute, for example, the method performed by the first network device shown in FIG. 5. As shown in FIG. 11, the scheduling apparatus 500 may include: a main control board 501, an interface board 502, and an interface board 503. When there are a plurality of interface boards, a switching board (not shown in the figure) may be included. The switching board is configured to complete data exchange between interface boards (the interface board is also referred to as a line card or a service board).

The main control board 501 is configured to complete functions such as system management, device maintenance, and protocol processing. The interface boards 502 and 503 are configured to provide various service interfaces, such as a packet over SONET/SDH (POS) interface, a gigabit Ethernet (GE) interface, and an asynchronous transfer mode (ATM) interface, and implement packet forwarding. SONET refers to a synchronous optical network, and SDH refers to a synchronous digital hierarchy. The main control board 501 includes three types of functional units: a system management control unit, a system clock unit, and a system maintenance unit. The main control board 501, the interface board 502, and the interface board 503 are connected to a system backplane through a system bus to implement interworking. The interface board 502 includes one or more processors 5021. The processor 5021 is configured to control and manage the interface board, and communicate with a central processing unit 5011 on the main control board 501, and is configured for forwarding processing of a packet. The memory 5022 on the interface board 502 is configured to store a forwarding entry, and the processor 5021 forwards a packet by searching for the forwarding table entry stored in the memory 5022.

The interface board 502 includes one or more network interfaces 5023, configured to receive a packet sent by a previous-hop node, and send a processed packet to a next-hop node based on instructions of the processor 5021. A specific implementation process is not described in detail herein again. Similarly, specific functions of the processor 5021 are not described in detail herein again.

It can be understood that, as shown in FIG. 11, in this embodiment, a plurality of interface boards are included, and a distributed forwarding mechanism is used. In this mechanism, a structure of the interface board 503 is basically similar to a structure of the interface board 502, and an operation on the interface board 503 is basically similar to an operation of the interface board 502. For brevity, details are not described again. In addition, it can be understood that the processor 5021 and/or the processor 5031 on the interface board in FIG. 11 may be dedicated hardware or a chip, for example, a network processor or an application-specific integrated circuit, to implement the foregoing functions. This implementation is generally referred to as a manner of using dedicated hardware or a chip for processing on a forwarding plane. In another implementation, the processor 5021 and/or 5031 may alternatively use a general-purpose processor, for example, a general-purpose CPU, to implement the functions described above.

In addition, it should be understood that there may be one or more main control boards. When there are a plurality of main control boards, a primary main control board and a secondary main control board may be included. There may be one or more interface boards. A stronger data processing capability of the first network device indicates more interface boards. In a case of a plurality of interface boards, the plurality of interface boards can communicate with each other through one or more switching boards, and the plurality of interface boards can load and share redundancy backup together. In a centralized forwarding architecture, the first network device may not need a switching board, and the interface board undertakes a function for processing service data of the entire system. In a distributed forwarding architecture, the first network device includes a plurality of interface boards, and data exchange between the plurality of interface boards may be implemented through the switching board, to provide a large-capacity data exchange and processing capability. Therefore, a data access and processing capability of a network device in the distributed architecture is greater than that of a network device in the centralized architecture. A specific architecture that is to be used depends on a specific networking deployment scenario. This is not limited herein.

In an embodiment, the memory 5022 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another disc storage, an optical disc storage (including a compact disc, a laser disc, an optical disc, a digital versatile disc, a Blu-ray disc, or the like), a magnetic disk or another magnetic storage device, or any other medium that can be used to carry or store expected program code in a form of instructions or a data structure and that can be accessed by a computer, but is not limited thereto. The memory 5022 may exist independently, and is connected to the processor 5021 through a communication bus. The memory 5022 may alternatively be integrated in the processor 5021.

The memory 5022 is configured to store program code, and the program code is executed under control of the processor 5021, to perform the service flow scheduling method provided in the foregoing embodiment. The processor 5021 is configured to execute the program code stored in the memory 5022. The program code may include one or more software modules. The one or more software modules may be functional modules in the embodiment shown in FIG. 9.

In an embodiment, the network interface 5023 may be any apparatus using a network interface, and is configured to communicate with another device or a communication network, for example, an Ethernet, a radio access network (RAN), or a wireless local area network (WLAN).

An embodiment further provides a computer-readable storage medium. The computer-readable storage medium stores instructions, and when the instructions or code is executed on a computer, the computer is enabled to execute the service flow scheduling method provided in the foregoing method embodiment, for example, to perform the method performed by the first network device shown in FIG. 5.

An embodiment further provides a computer program product including instructions. When the computer program product is run on a computer, the computer is enabled to perform the service flow scheduling method provided in the foregoing method embodiment, for example, to perform the method performed by the first network device shown in FIG. 5.

An embodiment further provides a chip. The chip includes a programmable logic circuit and/or program instructions. The chip may be configured to perform the service flow scheduling method provided in the foregoing method embodiment, for example, to perform the method performed by the first network device shown in FIG. 5. Optionally, the chip may be a traffic management (TM) chip.

An embodiment further provides a network device. The network device may be the first network device in the foregoing embodiment, and may be configured to implement the service flow scheduling method provided in the foregoing embodiment.

In a possible implementation, the network device may include the service flow scheduling apparatus provided in the foregoing embodiment. For example, the network device may include the service flow scheduling apparatus shown in FIG. 9, FIG. 10, or FIG. 11. In another possible implementation, the network device may include the chip provided in the foregoing embodiment.

An embodiment further provides a traffic scheduling system. The traffic scheduling system includes a terminal and a first network device. The first network device is configured to schedule a service flow to the terminal.

In a possible implementation, the first network device may include the service flow scheduling apparatus provided in the foregoing embodiment. For example, the first network device may include the service flow scheduling apparatus shown in FIG. 9, FIG. 10, or FIG. 11. In another possible implementation, the first network device may include the chip provided in the foregoing embodiment.

Optionally, referring to FIG. 1 to FIG. 4, the first network device may be the SR/BRAS 20, the LSW 30, the OLT 40, or the ONT 50 in the traffic scheduling system. In this embodiment, the traffic scheduling system may further include one or more cascaded second network devices, and the first network device may be connected to the terminal through the one or more cascaded second network devices. For example, refer to FIG. 1 to FIG. 4, in a scenario, the first network device is the SR/BRAS 20, the traffic scheduling system may further include a second network device, and the second network device is any one of the LSW 30, the OLT 40, and the ONT 50. In another scenario, the first network device is the SR/BRAS 20, the traffic scheduling system may further include two second network devices, and the two second network devices are any two of the LSW 30, the OLT 40, and the ONT 50. In still another scenario, the first network device is the SR/BRAS 20, the traffic scheduling system may further include three second network devices that are sequentially cascaded, and the three second network devices are respectively the LSW 30, the OLT 40, and the ONT 50. That is, the SR/BRAS 20, as the first network device, may be connected to the terminal through the LSW 30, the OLT 40, and the ONT 50 that are sequentially cascaded.

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, all or some of the processes or functions according to embodiments are produced. The computer may be a general-purpose computer, a dedicated computer, a computer network, or any other programmable apparatus. The computer instructions may be stored in a non-transitory computer-readable storage medium, or may be transmitted from a computer-readable storage medium to another computer-readable storage medium. For example, the computer instructions may be transmitted from a website, a computer, a server or a data center to another website, computer, server or data center in a wired (for example, a coaxial cable, an optical fiber, a digital subscriber line (digital subscriber line, DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a tape), an optical medium (for example, a digital versatile disc (DVD)), or a semi-conductive medium (for example, a solid-state disk (SSD)).

It should be understood that "at least one" means one or more, and "a plurality of" means two or more. In the description, to clearly describe the solutions in embodiments, words such as "first" and "second" are used to distinguish between same items or similar items whose functions are basically the same. A person skilled in the art may understand that words such as "first" and "second" do not limit a quantity and an execution sequence. The terms "system" and "network" may be used interchangeably.

It should be further understood that, "and/or" indicates that three relationships may exist. For example, A and/or B may indicate the following three cases: only A exists, both A and B exist, and only B exists. The character "/" generally indicates an "or" relationship between the associated objects.

The foregoing descriptions are merely optional implementations, but are not intended as limiting. Any equivalent modification or replacement readily figured out by a person skilled in the art shall fall within the scope of the embodiments.

What is claimed is:

1. A service flow scheduling method, applied to a first network device, the method comprising:
   separately scheduling a first service flow and a second service flow based on a hierarchical quality of service (HQoS) model, wherein a priority of the first service flow is higher than a priority of the second service flow; and
   adjusting, to a first threshold, a transmission rate threshold of the HQoS model for the second service flow when transmission quality of the first service flow does not meet a service level requirement corresponding to the first service flow, wherein the first threshold is less than a current data transmission rate of the second service flow;
   wherein the first network device is connected to a terminal through a second network device; and the HQoS model comprises: a first-level scheduler corresponding to a downlink port of the first network device, a second-level scheduler corresponding to a downlink port of the second network device, a first underlying scheduler configured to transmit the first service flow through the downlink port of the second network device, and a second underlying scheduler configured to transmit the second service flow through the downlink port of the second network device; and
   wherein a sum of a transmission rate threshold of the first-level scheduler for the first service flow and that of the first-level scheduler for the second service flow is less than or equal to a maximum bandwidth of the downlink port of the first network device; and a sum of a transmission rate threshold of the second-level scheduler for the first service flow and that of the second-level scheduler for the second service flow is less than or equal to a maximum bandwidth of the downlink port of the second network device.

2. The service flow scheduling method according to claim 1, wherein the first threshold is greater than or equal to an average data transmission rate of the second service flow.

3. The service flow scheduling method according to claim 1, wherein the adjusting, to a first threshold, a transmission rate threshold of the HQoS model for the second service flow comprises: adjusting, to the first threshold, the transmission rate threshold of the HQoS model for the second service flow when the transmission quality of the first service flow does not meet the service level requirement corresponding to the first service flow and the current data transmission rate of the second service flow is greater than a peak threshold of a data transmission rate of the second service flow.

4. The service flow scheduling method according to claim 1, wherein the transmission rate threshold of the second service flow comprises one or more of the following: a peak information rate (PIR), a committed access rate (CAR), a committed information rate (CIR), and an excess information rate (EIR).

5. The service flow scheduling method according to claim 1, wherein the-adjusting, to the first threshold, the transmission rate threshold of the HQoS model for the second service flow comprises: adjusting, to the first threshold, a transmission rate threshold of at least one scheduler of the first-level scheduler, the second-level scheduler, and the second underlying scheduler for the second service flow.

6. The service flow scheduling method according to claim 1, wherein the-adjusting, to the first threshold, the transmission rate threshold of the HQoS model for the second service flow comprises: determining a target scheduler on which network congestion occurs during transmission of the first service flow, wherein the target scheduler is the first-level scheduler or the second-level scheduler; and adjusting, to the first threshold, a transmission rate threshold of the target scheduler for the second service flow.

7. The service flow scheduling method according to claim 1, wherein the first underlying scheduler comprises a first queue for buffering a packet of the first service flow, and the second underlying scheduler comprises a second queue for buffering a packet of the second service flow; and
   a sum of a maximum queue buffer of the first queue and a maximum queue buffer of the second queue is less than or equal to a maximum port buffer of the downlink port of the second network device.

8. The service flow scheduling method according to claim 1, wherein an upper limit of a delay in the service level requirement of the first service flow is less than an upper limit of a delay in a service level requirement of the second service flow.

9. The service flow scheduling method according to claim 1, further comprising:
   scheduling a third service flow based on the HQoS model, wherein a priority of the third service flow is higher than the priority of the second service flow and lower than the priority of the first service flow; and
   adjusting, to a second threshold, a transmission rate threshold of the HQoS model for the third service flow when the transmission rate threshold of the second service flow is less than or equal to the average data transmission rate of the second service flow or when the current data transmission rate of the second service flow is less than or equal to the peak threshold of the data transmission rate of the second service flow, wherein the second threshold is less than a current data transmission rate of the third service flow.

10. A service flow scheduling apparatus, used in a first network l device, the scheduling apparatus comprising:
    a non-transitory memory storing instructions; and
    a processor coupled to the non-transitory memory; wherein the instructions, when executed by the processor, cause the apparatus to be configured to:
    separately schedule a first service flow and a second service flow based on a hierarchical quality of service (HQoS) model, wherein a priority of the first service flow is higher than a priority of the second service flow; and
    adjust, to a first threshold, a transmission rate threshold of the HQoS model for the second service flow when transmission quality of the first service flow does not meet a service level requirement corresponding to the first service flow, wherein the first threshold is less than a current data transmission rate of the second service flow;
    wherein the first network device is connected to a terminal through a second network device; and the HQoS model comprises: a first-level scheduler corresponding to a downlink port of the first network device, a second-level scheduler corresponding to a downlink port of the second network device, a first underlying scheduler configured to transmit the first service flow through the downlink port of the second network device, and a second underlying scheduler configured to transmit the second service flow through the downlink port of the second network device;

wherein a sum of a transmission rate threshold of the first-level scheduler for the first service flow and that of the first-level scheduler for the second service flow is less than or equal to a maximum bandwidth of the downlink port of the first network device; and a sum of a transmission rate threshold of the second-level scheduler for the first service flow and that of the second-level scheduler for the second service flow is less than or equal to a maximum bandwidth of the downlink port of the second network device.

11. The scheduling apparatus according to claim 10, wherein the first threshold is greater than or equal to an average data transmission rate of the second service flow.

12. The scheduling apparatus according to claim 10, wherein the instructions, when executed by the processor, further cause the apparatus to be configured to:
adjust, to the first threshold, the transmission rate threshold of the HQoS model for the second service flow when the transmission quality of the first service flow does not meet the service level requirement corresponding to the first service flow and the current data transmission rate of the second service flow is greater than a peak threshold of a data transmission rate of the second service flow.

13. The scheduling apparatus according to claim 10, wherein the transmission rate threshold of the second service flow comprises one or more of the following: a peak information rate (PIR), a committed access rate (CAR), a committed information rate (CIR), and an excess information rate (EIR).

14. The scheduling apparatus according to claim 10, wherein the instructions, when executed by the processor, further cause the apparatus to be configured to:
adjust, to the first threshold, a transmission rate threshold of at least one scheduler of the first-level scheduler, the second-level scheduler, and the second underlying scheduler for the second service flow.

15. The scheduling apparatus according to claim 14, wherein the instructions, when executed by the processor, further cause the apparatus to be configured to:
determine a target scheduler on which network congestion occurs during transmission of the first service flow, wherein the target scheduler is the first-level scheduler or the second-level scheduler; and
adjust, to the first threshold, a transmission rate threshold of the target scheduler for the second service flow.

16. The scheduling apparatus according to claim 10, wherein the first underlying scheduler comprises a first queue for buffering a packet of the first service flow, and the second underlying scheduler comprises a second queue for buffering a packet of the second service flow; and
a sum of a maximum queue buffer of the first queue and a maximum queue buffer of the second queue is less than or equal to a maximum port buffer of the downlink port of the second network device.

* * * * *